(12) United States Patent
Stockstill

(10) Patent No.: US 7,029,206 B2
(45) Date of Patent: *Apr. 18, 2006

(54) REEL TYPE PIPELINE LAYING SHIP AND METHOD

(76) Inventor: Lyle Stockstill, 113 Victoria Dr., Belle Chasse, LA (US) 70037

( * ) Notice: Subject to any disclaimer, the term of this patent is extended or adjusted under 35 U.S.C. 154(b) by 0 days.

This patent is subject to a terminal disclaimer.

(21) Appl. No.: 10/842,963

(22) Filed: May 11, 2004

(65) Prior Publication Data

US 2005/0036842 A1 Feb. 17, 2005

Related U.S. Application Data

(63) Continuation of application No. 10/285,376, filed on Oct. 31, 2002, now Pat. No. 6,733,208, which is a continuation of application No. PCT/US02/21253, filed on Jul. 3, 2002, and a continuation-in-part of application No. 10/117,946, filed on Apr. 8, 2002, now Pat. No. 6,702,519, which is a continuation-in-part of application No. 09/898,561, filed on Jul. 3, 2001, now Pat. No. 6,554,538.

(51) Int. Cl.
*F16L 1/19* (2006.01)
(52) U.S. Cl. .................. 405/169; 405/168.3; 405/168.4
(58) Field of Classification Search ................ 405/158, 405/166, 167, 168.1, 168.2, 168.3, 168.4, 405/169, 170
See application file for complete search history.

(56) References Cited

U.S. PATENT DOCUMENTS 3,237,438 A 3/1966 Tesson (Continued)

FOREIGN PATENT DOCUMENTS

AU 696337 B2 7/1996

(Continued)

*Primary Examiner*—Michael Safavi
(74) *Attorney, Agent, or Firm*—Garvey,Smith,Nehrbass & North, L.L.C.; Brett A. North

(57) ABSTRACT

A pipeline laying ship and an improved method of laying a pipeline in a marine environment is disclosed. The pipeline laying ship is a dynamically positioned barge or self-propelled dynamically positioned vessel with a hull having a deck area that supports a pair of reels. The reels are independently rotatable, and are position to generally port and starboard relative to one another. A pipe joint storage area is provided for containing multiple joints of pipe. One or more pipeline welding stations are provided on the deck next to the reels, the pipeline welding stations being positioned to join the joints of pipe together to form an elongated pipeline that can be wound upon a selected reel of said pair of reels. A tower is provided for guiding the elongated pipeline as it is unwound from a selected reel, the tower including at least a bend controller, a straightener and a tensioner. The tower is transversely and movably mounted upon the hull between the port and starboard positions that enable a pipeline to be welded and then wound upon either of the reels and to be unwound from either of the reels for launching to the sea bed via the tower. The tower can be mounted upon a transverse track. The tower can be positioned aft for launching the pipeline from the hull stern. The tower can be mounted amidships for launching the pipeline through a vertical hull opening or "moon pool". A specially configured clamp is mounted on the hull below the top of the tower for clamping and holding the pipeline as it is launched from the tower to the water's surface. The clamp can be moved with a section of the clamped pipeline between port and starboard positions enabling other pipe sections (e.g. manifolds) to be welded to the pipeline above the clamp.

20 Claims, 20 Drawing Sheets

U.S. PATENT DOCUMENTS

| | | | |
|---|---|---|---|
| 3,331,212 A | 7/1967 | Cox et al. | |
| 3,372,461 A | 3/1968 | Tesson | |
| 3,581,506 A | 6/1971 | Howard | |
| 3,644,695 A | 2/1972 | Sheuy, Jr. et al. | |
| 3,680,322 A * | 8/1972 | Nolan et al. | 405/166 |
| 3,680,342 A | 8/1972 | Mott et al. | |
| 3,685,306 A | 8/1972 | Mott | |
| 3,775,987 A | 12/1973 | Rochelle et al. | |
| 3,945,580 A | 3/1976 | Veyrassat | |
| 3,952,960 A | 4/1976 | Veyrassat | |
| 3,982,402 A | 9/1976 | Lang et al. | |
| 4,012,001 A | 3/1977 | Knox | |
| RE29,591 E | 3/1978 | Lloyd | |
| 4,112,695 A | 9/1978 | Chang et al. | |
| 4,157,023 A | 6/1979 | Tisdale et al. | |
| 4,165,571 A | 8/1979 | Chang et al. | |
| 4,218,158 A | 8/1980 | Tesson | |
| 4,230,421 A | 10/1980 | Springett et al. | |
| 4,243,345 A | 1/1981 | Cha et al. | |
| 4,260,287 A | 4/1981 | Uyeda et al. | |
| 4,269,540 A | 5/1981 | Uyeda et al. | |
| 4,274,799 A | 6/1981 | Tisdale et al. | |
| 4,297,054 A | 10/1981 | Yenzer et al. | |
| RE30,846 E | 1/1982 | Lang et al. | |
| 4,340,322 A | 7/1982 | Springett et al. | |
| 4,345,855 A | 8/1982 | Uyeda et al. | |
| 4,353,515 A | 10/1982 | Weaver et al. | |
| 4,448,568 A | 5/1984 | Gentry et al. | |
| 4,454,999 A | 6/1984 | Woodruff | |
| 4,486,123 A | 12/1984 | Koch et al. | |
| 4,493,463 A | 1/1985 | Rivinius | |
| 4,538,937 A | 9/1985 | Lynch | |
| 4,558,971 A | 12/1985 | David | |
| 4,591,294 A | 5/1986 | Foulkes | |
| 4,594,871 A | 6/1986 | de Boer | |
| 4,649,954 A | 3/1987 | Dunwoody | |
| 4,659,253 A | 4/1987 | Jacobson | |
| 4,687,376 A | 8/1987 | Recalde | |
| 4,721,410 A | 1/1988 | Recalde | |
| 4,723,874 A | 2/1988 | Recalde | |
| 4,765,776 A | 8/1988 | Howson | |
| 4,789,108 A | 12/1988 | Recalde | |
| 4,802,794 A | 2/1989 | Lynch | |
| 4,820,082 A | 4/1989 | Recalde | |
| 4,913,080 A | 4/1990 | Kindem et al. | |
| 4,961,671 A | 10/1990 | Recalde | |
| 4,984,934 A | 1/1991 | Recalde | |
| 4,992,001 A | 2/1991 | Harrison | |
| 5,044,825 A | 9/1991 | Kaldenbach | |
| 5,348,423 A | 9/1994 | Maloberti et al. | |
| 5,413,434 A | 5/1995 | Stenfert et al. | |
| 5,421,675 A | 6/1995 | Brown et al. | |
| 5,527,134 A | 6/1996 | Recalde | |
| 5,533,834 A | 7/1996 | Recalde | |
| 5,573,353 A | 11/1996 | Recalde | |
| 5,590,915 A | 1/1997 | Recalde | |
| 5,630,678 A | 5/1997 | Branchut et al. | |
| 5,718,538 A | 2/1998 | Recalde | |
| 5,823,712 A | 10/1998 | Kalkman et al. | |
| 5,836,719 A | 11/1998 | Martin et al. | |
| 5,971,666 A | 10/1999 | Martin et al. | |
| 5,975,802 A | 11/1999 | Willis | |
| 5,986,236 A | 11/1999 | Gainand et al. | |
| 6,004,071 A | 12/1999 | Broeder et al. | |
| 6,056,478 A | 5/2000 | Martin et al. | |
| 6,089,489 A | 7/2000 | Cruickshank | |
| 6,149,347 A | 11/2000 | Scott | |
| 6,352,388 B1 | 3/2002 | Seguin | |
| 6,361,250 B1 | 3/2002 | de Varax | |
| 6,361,251 B1 | 3/2002 | Soltanahmadi et al. | |
| 6,371,694 B1 | 4/2002 | de Varax et al. | |
| 6,398,457 B1 | 6/2002 | Baugh | |
| 6,425,709 B1 | 7/2002 | Frijns | |
| 6,554,538 B1 | 4/2003 | Stockstill | |
| 6,702,519 B1 | 3/2004 | Stockstill | |
| 6,733,208 B1 | 5/2004 | Stockstill | |
| 6,761,505 B1 | 7/2004 | Stockstill | |

FOREIGN PATENT DOCUMENTS

| | | |
|---|---|---|
| DE | DT2425249 | 1/1975 |
| EP | 0302038 | 2/1989 |
| EP | 0507572 A1 | 7/1992 |
| EP | 1063163 A2 | 12/2000 |
| FR | 2447852 | 8/1980 |
| GB | 2046207 A | 11/1980 |
| GB | 2178129 A | 2/1987 |
| GB | 2199631 A | 7/1988 |
| GB | 2210673 A | 6/1989 |
| GB | 2287518 A | 9/1995 |
| GB | 2296956 A | 7/1996 |
| GB | 2302157 A | 1/1997 |
| GB | 2287297 B | 6/1997 |
| JP | 4-145818 | 5/1992 |
| RU | 2090433 | 9/1997 |
| SU | 715-431 | 2/1980 |
| WO | WO 95/25237 | 9/1995 |
| WO | WO 95/25238 | 9/1995 |
| WO | WO 96/27751 | 9/1996 |
| WO | WO01/07812 A1 | 2/2001 |

* cited by examiner

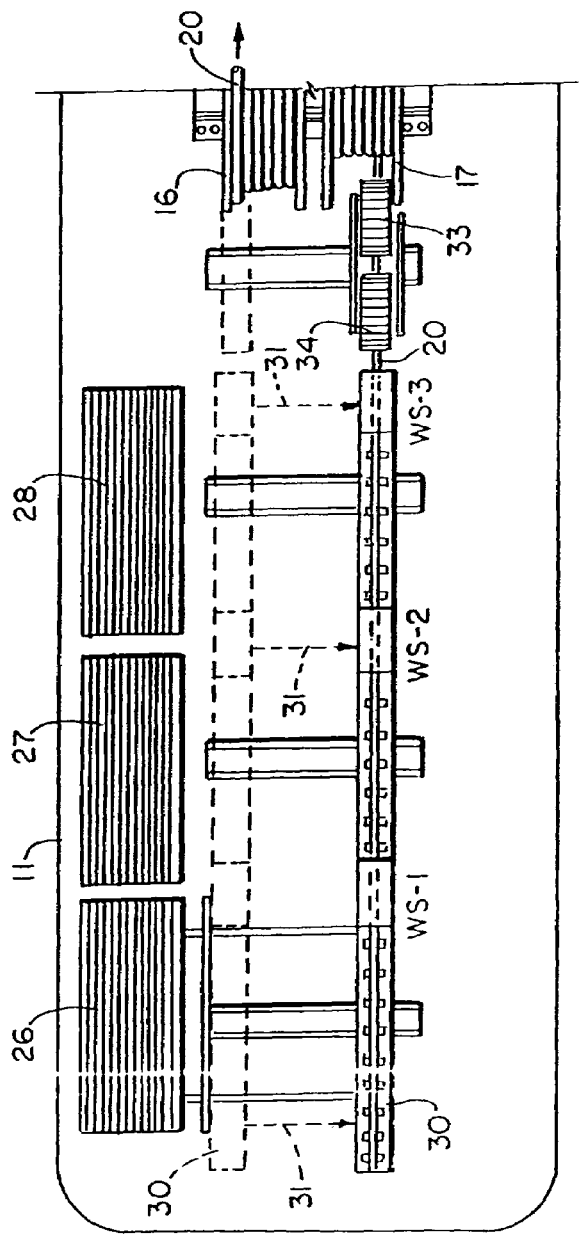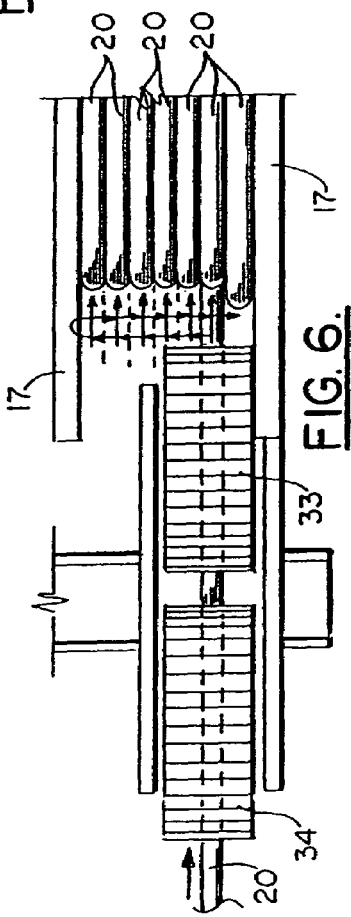

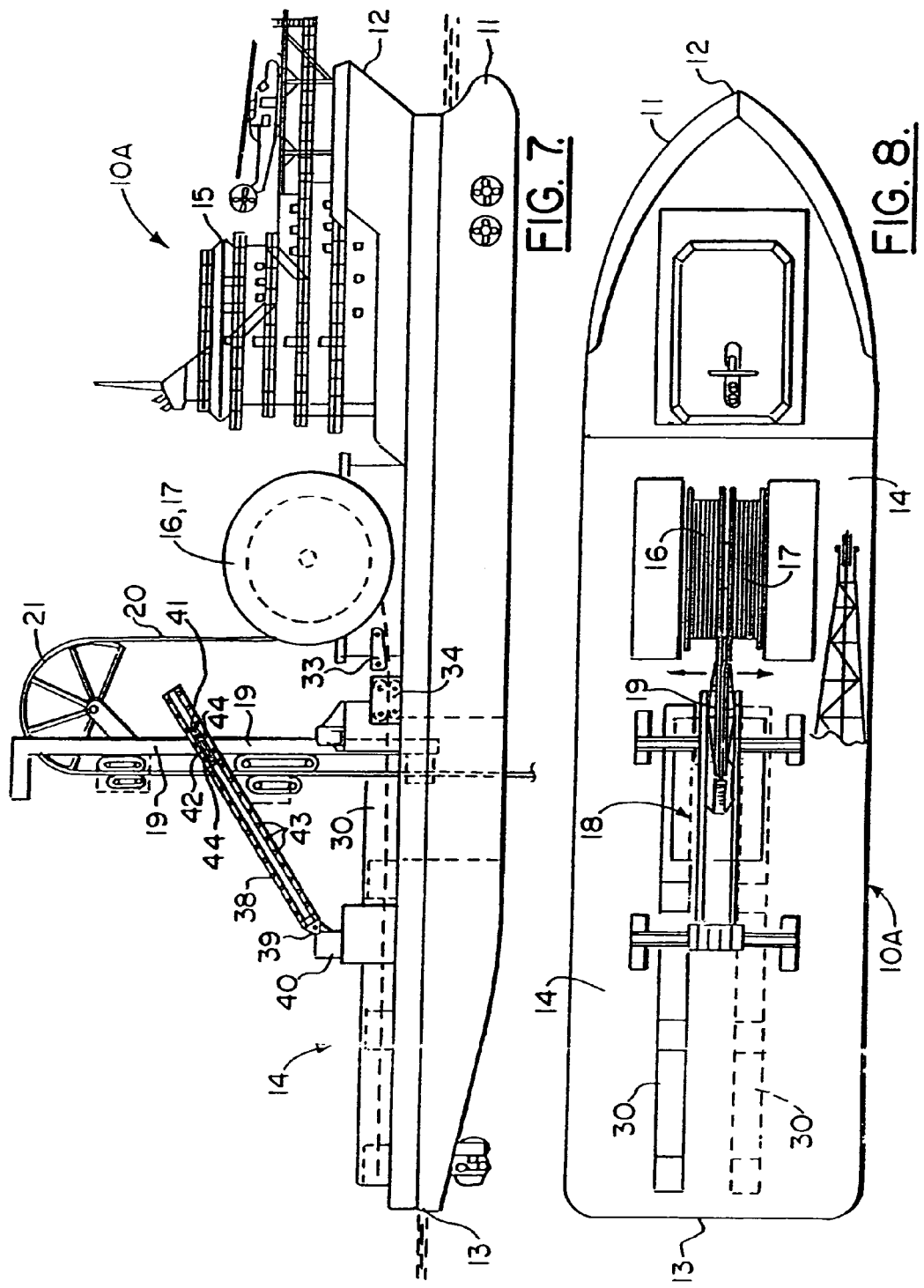

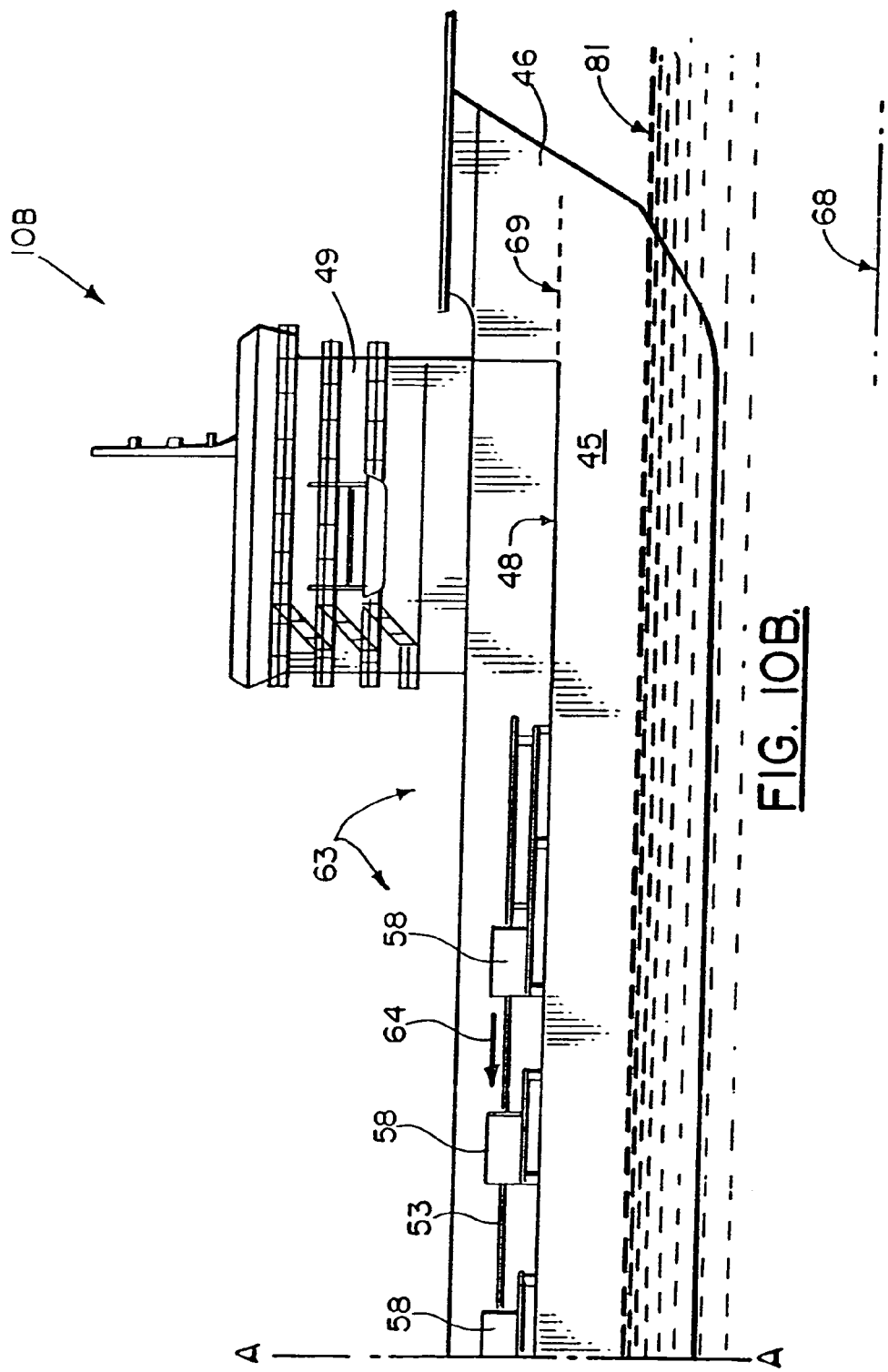

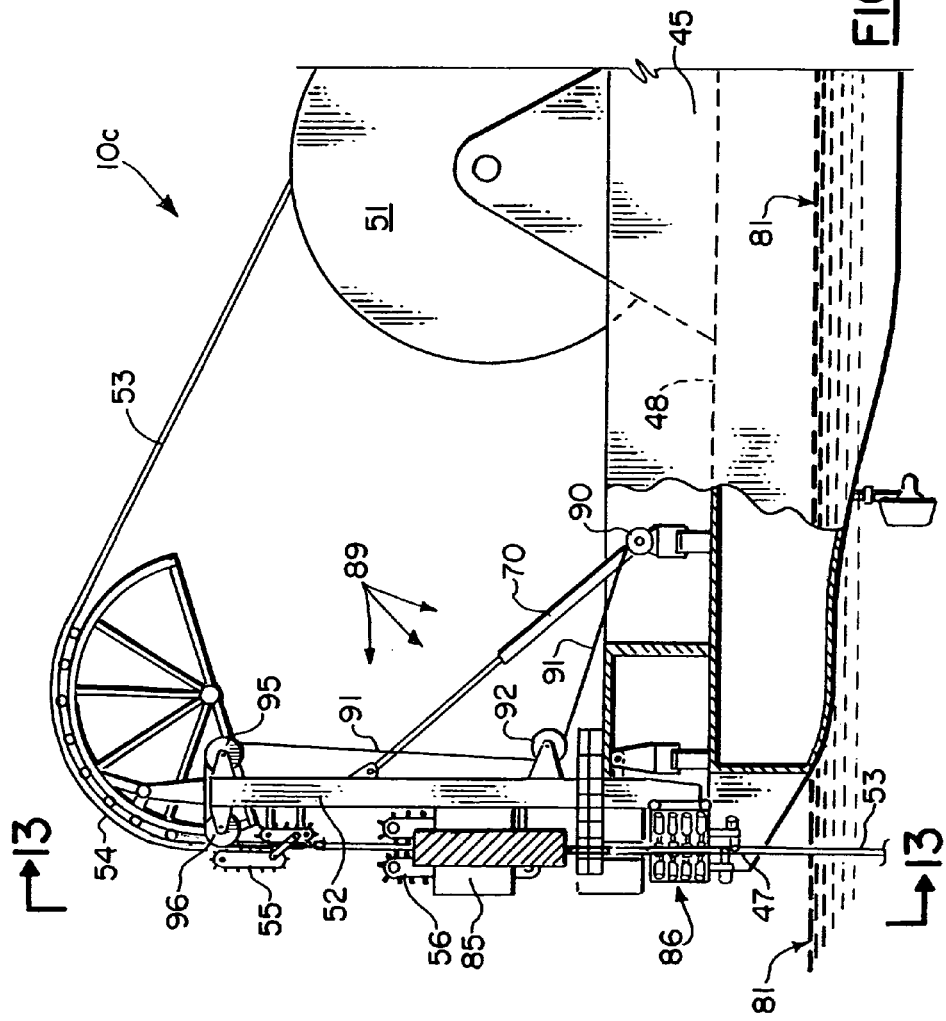

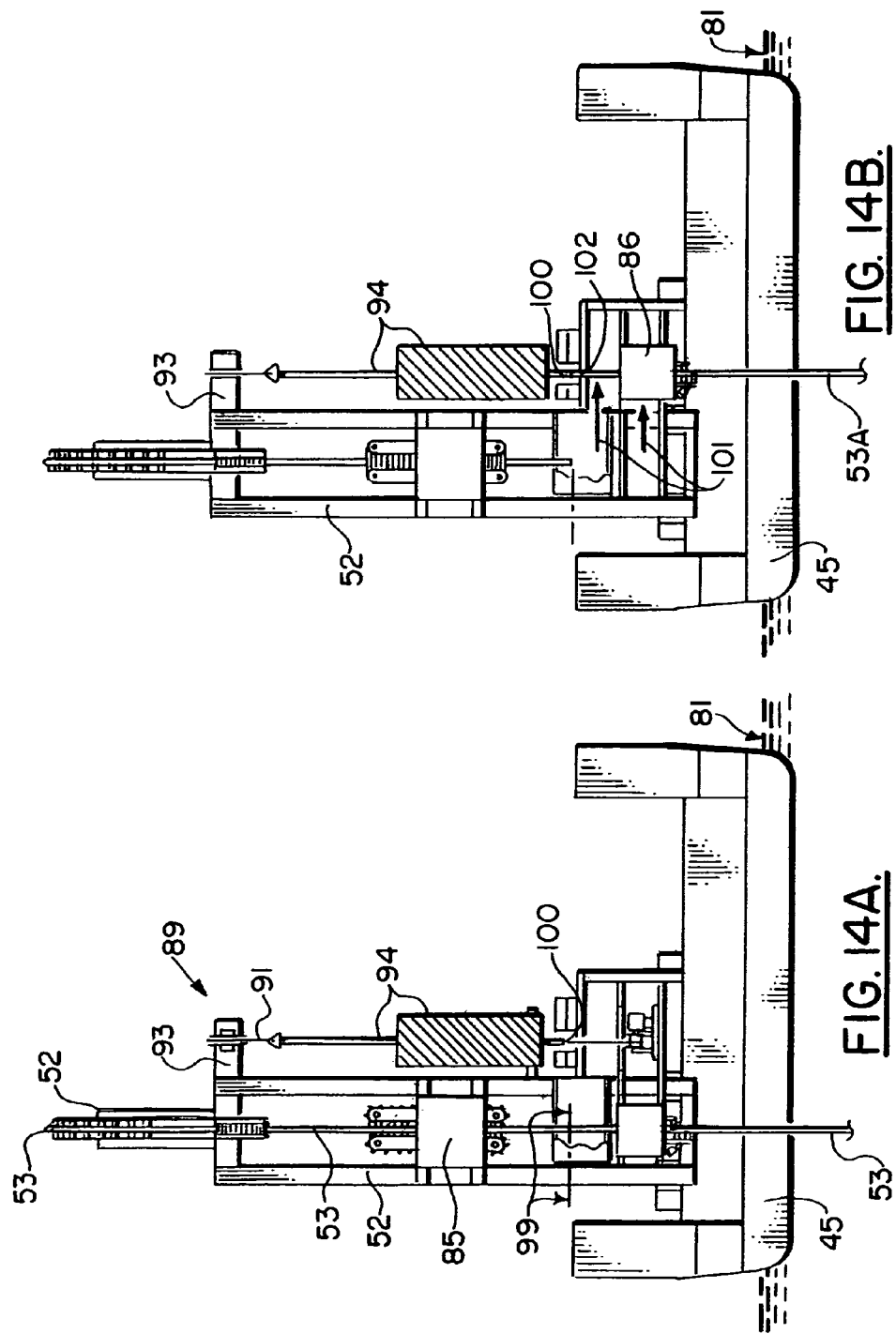

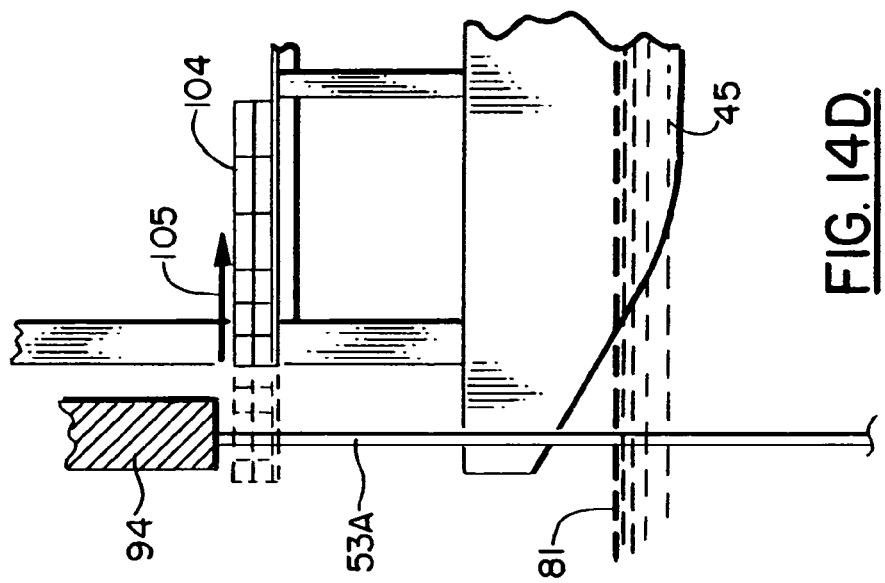
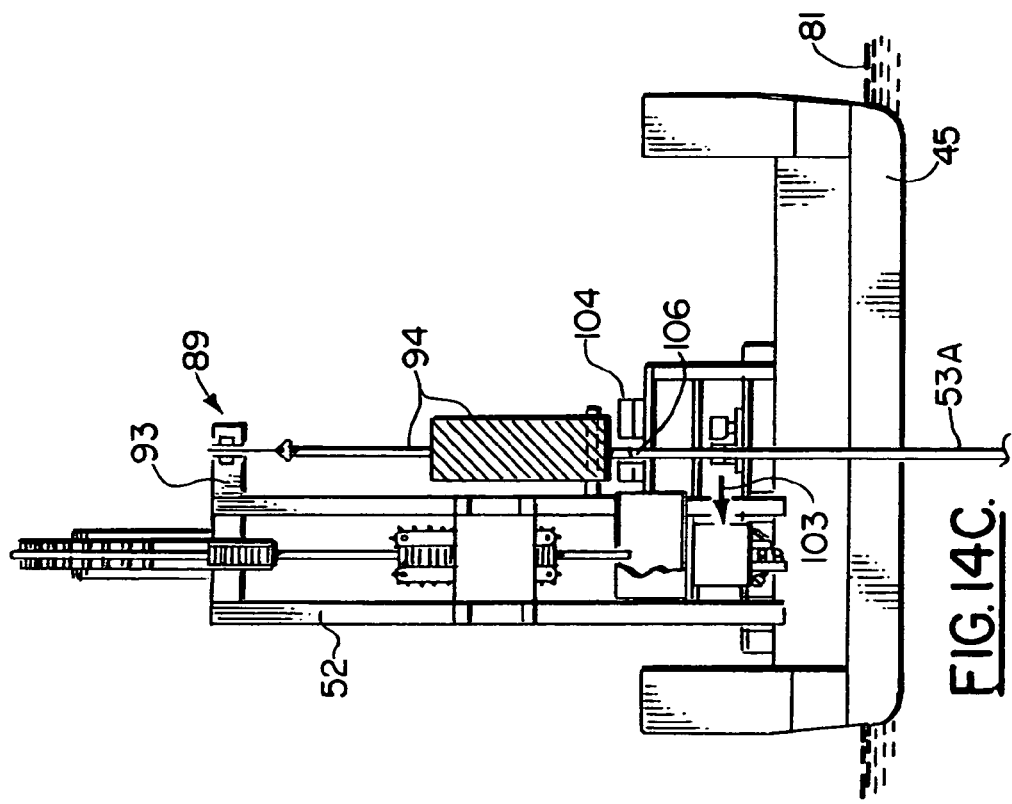

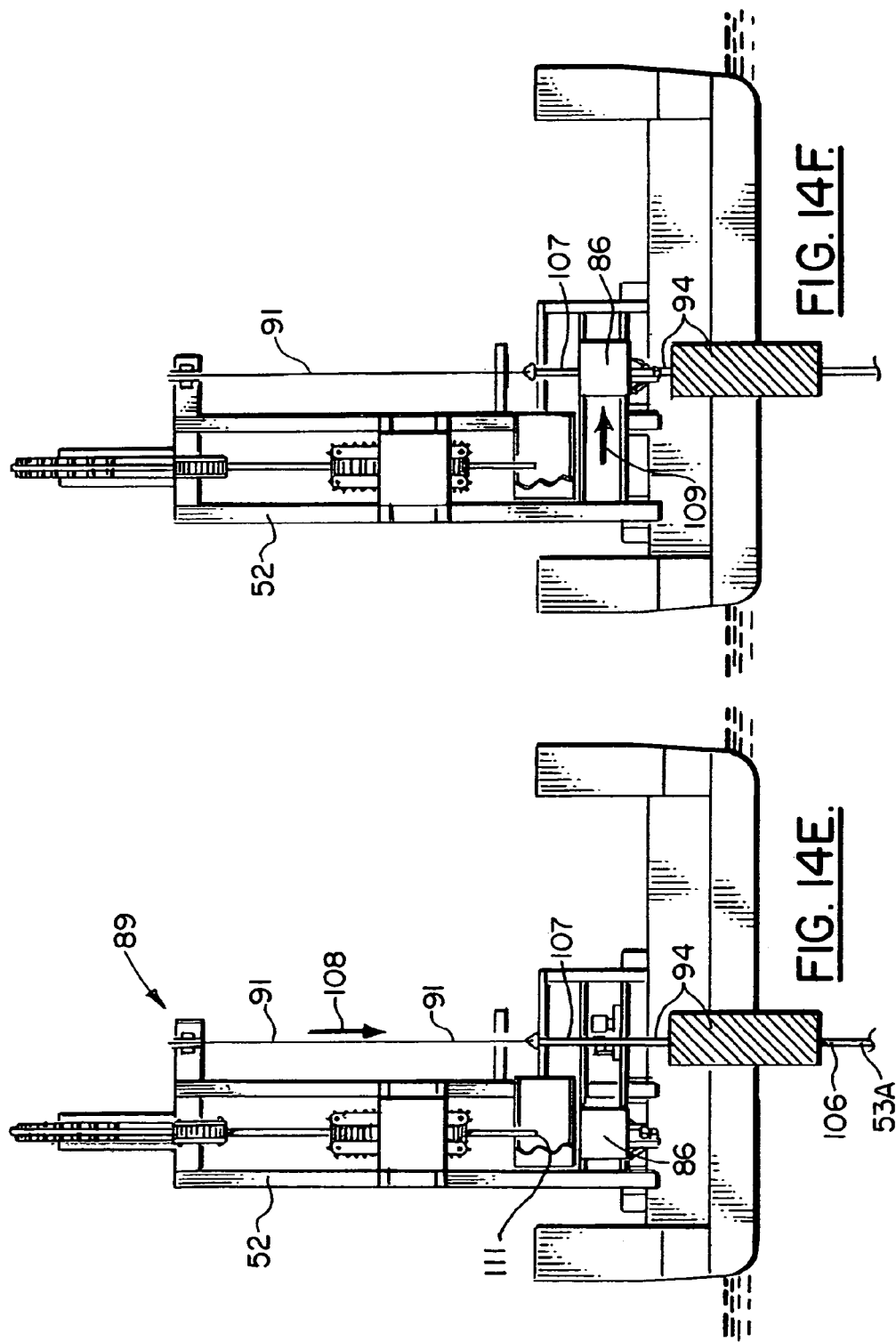

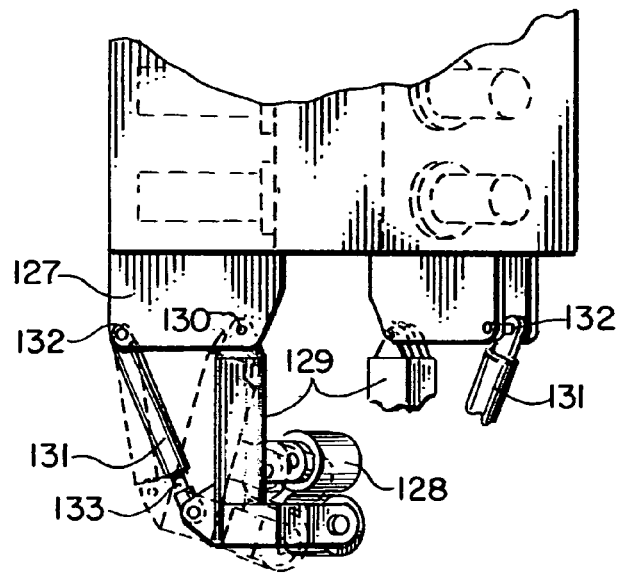
FIG. 17.
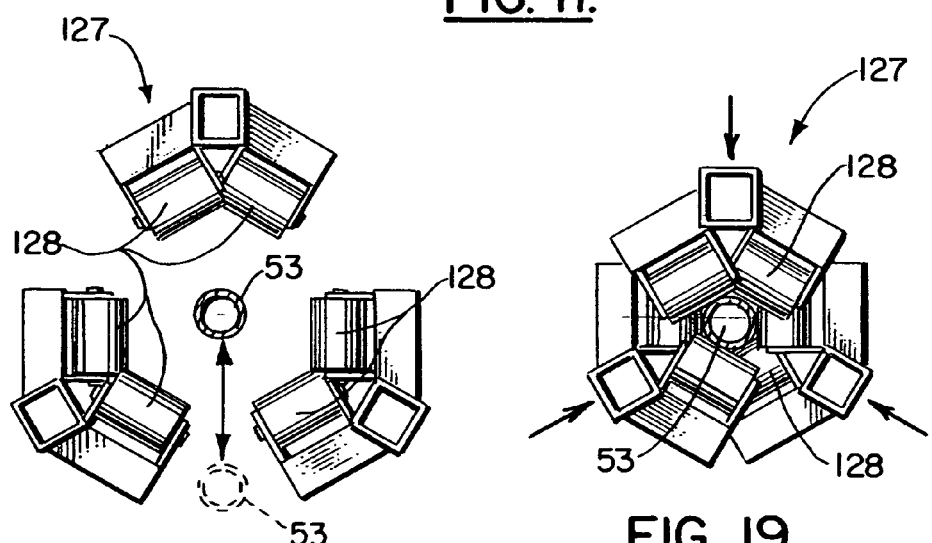
FIG. 18.
FIG. 19.

REEL TYPE PIPELINE LAYING SHIP AND METHOD

CROSS-REFERENCE TO RELATED APPLICATIONS

This is a continuation of U.S. patent application Ser. No. 10/285,376, filed Oct. 31, 2002(now U.S. Pat. No. 6,733, 208), which is a continuation of PCT Patent application No. PCT/US023/21253 and a continuation-in-part of U.S. patent application Ser. No. 10/117,946, filed Apr. 8, 2002 (now U.S. Pat. No. 6,702,519), which is a continuation-in-part of U.S. patent application Ser. No. 09/898,561, filed Jul. 3, 2001 (now U.S. Pat. No. 6,554,538), all incorporated herein by reference.

Priority of all of the above referenced applications is hereby claimed. All of the above referenced applications are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

1. Field

The present invention relates to the placement of pipelines and pipeline manifolds in a marine environment. More particularly, the present invention relates to an improved method and apparatus for laying a pipeline in a marine environment, wherein a specially configured pipeline laying ship provides a hull with a deck area and having a pair of reels independently rotatable during use, and wherein a pipeline fabricating "firing line" fabricates a pipeline that is then wound upon a selected one of the reels. The pipeline "firing line" can be moved in order to align with either of the reels that is selected. Additionally, the pipeline can be payed out from either of the selected reels after it has been fabricated. A tower is provided for directing the pipeline from a reel through bend control and straightening stations and then to the seabed. The tower can be positioned at the vessel stern, or amidships for launching the pipeline through a vertical hull opening or "moon pool".

2. General Background

For many years, pipelines have been fabricated at sea and lowered to the seabed at a desired location. For example, early patents to Tesson include U.S. Pat. Nos. 3,237,438 and 3,337,469 that are directed to a pipeline laying barge and method of operation. In the Tesson patents, the joints of pipe are welded on deck and then spooled or wound upon a reel. At a desired location, the pipeline is then placed on the seabed by unwinding the pipe from the reel and straightening it before it is lowered to the seabed. A tilting tower has also been used to lower a pipeline to the seabed as the pipeline is being unwound from a reel. An example of such a titling tower and reel pipeline laying arrangement can be seen in the Uyeda U.S. Pat. No. 4,345,855 as an example. A similar arrangement is seen in the Springett U.S. Pat. No. 4,340,322. The Uyeda U.S. Pat. No. 4,345,855 and the Springett U.S. Pat. No. 4,430,322 are hereby incorporated herein by reference. Another method of laying a pipeline is through the use of a stinger. A stinger is simply an elongated boom structure that extends from usually one end of a hull or barge. The stinger supports the pipeline as it is being lowered to the seabed. Examples of the use of stingers can be seen us U.S. Pat. Nos. RE28,922, RE29,591 and 5,533, 834.

Reel type pipeline laying systems are typically employed in deep water situations. While it is known to weld the pipeline joints on the deck of a vessel and wind them upon a reel (for example, see the above discussed Tesson patents), it is also known to weld the pipeline on shore and then wind it upon the reel before the ship leaves port.

GENERAL DISCUSSION

The present invention provides an improved pipeline laying vessel and its method of operation. The method employs a preferably dynamically positioned barge or self-propelled dynamically positioned reel ship that has two independently rotatable reels or drums. The ship has a deck area that enables pipe joints to be welded together to form a pipeline. Joints of pipe are placed in a storage area on the deck of a vessel in suitable pipe racks. Welding stations near this storage area are arranged to receive multiple joints of pipe that have been internally cleaned and prepared for welding. Part of this preparation can include, for example, end bevels that are applied to the pipeline and to individual pipe joints.

As pipeline fabrication proceeds, pipe joints are moved from the rack storage areas to the pipeline fabrication area, also referred to herein as the "firing line."

This fabrication area or "firing line" can comprise essentially a set of rollers supporting the pipeline along the center line of the fabrication area. Welding equipment (manual or automatic) can be provided together with known weld preparation tools.

The incoming pipe joints are aligned with the pipeline being fabricated. The welded area between the pipe joints and the joints previously welded together can be adjusted as required. The pipe joints are progressively welded together to form a pipeline at multiple welding stations. The welds are tested and field joints are then coated at another work station located in the pipeline fabrication area.

When one or more joints of pipe have been welded together end-to-end on the firing line, a selected reel or drum is readied for storage of the assembled pipeline on provided reels or drums. In keeping with the present invention, two (2) reels or drums are provided. A selected length (eg. about forty feet or 12 m) of pipeline is advanced at any time and wound upon the reel by plastic bending. The pipeline moves ahead in the pipeline fabrication area by the same distance (eg. 40 feet increments or 12 m increments) through a back tensioning device.

The pipeline welding progresses until the selected drum or reel is filled with the pipeline that is being welded on the deck of the vessel. Each reel or drum can be between 30 and 70 feet (9 and 21 m) in diameter, have a width of between about 10–20 feet (3–6 m), and store, eg. 30,000–50,000 feet (9–15 km) of six inch (15.24 cm) pipe.

In order to arrange properly the pipeline on the selected reel drum during spooling, the firing line travels from one side of the ship to the other side in a coordinated back and forth direction to spool each wrap of the pipeline next to the previous wrap on the reel.

The firing line can also be configured to travel or be moved from one side of the ship to the other side if it is to align with the second drum, so that the pipeline fabricated on the ship deck can be spooled on either one of the reels. In other words, the pipeline "firing line" moves laterally as it is being spooled upon a first reel. However, the entire firing line can travel transversely on the ship's deck a larger distance in order to align with the second reel when the second reel is to be filled with pipeline.

When the ship undertakes pipe laying on the sea bottom, the pipeline that is stored on a selected reel leaves the drum in a direction tracking toward the top of the tilting tower. The titling tower can tilt in a position that varies, such as for example, between about 65 and 95 degrees from the deck plane. At the top of the tower, the pipeline bends through a bend controller downwardly toward the seabed. The tilting tower can also be provided with a device for straightening the pipeline, a tensioning device and a clamping device that can hold the pipeline and support the weight of the pipeline that extends downwardly toward the seabed.

It should be understood that the general concept of paying a wound pipeline from a reel to a tilting tower that has a bend controller, straightener, tensioner, and clamp mechanism is old and known in the art such as is shown in the above discussed Springett U.S. Pat. No. 4,340,322 and Uyeda U.S. Pat. No. 4,345,855 patents, each incorporated herein by reference.

With the improved arrangement of the present invention, the tower can move transversely in a port to starboard direction and in a starboard to port direction for two reasons. The tower can move transversely in order to coordinate with the reel rotation. This arrangement enables spooling the welded pipeline upon the reel or removing pipeline from the reel in an orderly fashion. Secondly, the firing line and tilting tower can be moved transversely in order to align with either the first or the second drum as selected by the vessel operators. This larger transverse movement occurs when winding of the pipeline on the first reel is complete, and the winding of the pipeline on the second reel begins.

When leaving the bend controller, the pipeline passes through a straightening device that imposes a reversed plastic bending on the pipeline in order to straighten it. The straightened pipeline then passes through a tensioner aligned with the tower. The combined tension imposed on the pipeline by the tensioner and the drum back tension compensates for the suspended weight of the pipeline during its travel from the ship to the sea bottom. This tension is adjusted depending on the various pipe laying parameters such as pipeline characteristics (eg. diameter, wall thickness, coating, alloy, wet or dry lay) and water depth during lay operations. The proper tilting of the tower and the control of the tensioner tension as the ship moves along the pipeline route ensure that the stresses in the pipeline are maintained within predetermined acceptable limits.

The area in between the last tensioner and the clamping mechanism or "hold off" clamp (or workstation) can be used to install manifolds, corrosion anodes and insulation coating when required on the pipeline joints that are welded in the pipeline fabrication area or "firing line," or in the tower itself. This work station can be used to initiate the pipeline, lay down, and testing devices at the beginning and the end of the pipeline lay operations from either of the two reels.

The clamping mechanism can be used to clamp the pipeline and hold it so that the pipeline can be cut above the clamp, severing it into two sections. This enables the clamp to hold the lower section of the pipeline (i.e. the section below the cut and between the vessel and seabed) while a manifold section or the like can be added to the pipeline.

The clamp moves laterally with the lower clamped pipeline section to an offset position that aligns the clamp and clamped pipeline section with a winch or like lifting device. The lifting device is preliminarily rigged to support the manifold section to be aligned. When the clamp has moved laterally with a supported pipeline section, it aligns with the manifold that is held by the lifting device.

The manifold section and pipeline section that is held by the clamp can then be welded together. The lifting device is then able to support the combination of manifold section and pipeline section that extends from the vessel to the seabed. The clamp can then be moved laterally away from the combination of manifold section and pipeline section that are now welded together so that the manifold section and pipeline can be lowered until the clamp can again grasp the manifold but above any enlarged portion of the manifold. Typically, the manifold section has one or more enlarged portions that are not small enough to be gripped by the clamp. Therefore, a part of the manifold section that can be clamped is lowered to the same elevational position as the clamp. The clamp can then move laterally to the manifold section and clamp it. The lifting device can then be separated from the combination of manifold and pipeline section that is now held by the clamp. The clamp can then return to its original starting position wherein the added manifold can be welded to the pipeline that is to be launched from the selected one of the reels and the tower.

The pipeline eventually leaves the ship after passing through the hold off clamp that has the ability to hold the pipeline suspended weight during lay down operations.

For pipelines that cannot be coiled on the reel drums, the tilting tower can be arranged to weld pipeline joints at one work station and to perform nondestructive testing and field joint coating at another work station.

The tension required to hold the weight of the suspended part of the pipeline being laid is being provided by the tensioner located on the tilting ramp and, when required, by the tension from an A & R (abandonment and recovery) winch wire. This wire can be routed to the top end of the pipeline through a sheave or sheaves located on top of the tower. In this case, collars are welded to the pipeline and are used to transfer the A & R winch rope tension to the pipeline.

The abandonment and recovery (A and R) winch can provide the lifting device for holding a manifold section that is to be added to the pipeline, as illustrated more particularly in FIGS. 14A–14H and as described in the specification.

When an umbilical or flexible line installation is required, the ship can load this product in either a large capacity rotating basket located, for example, below deck, or on several smaller reels located on the ship deck, depending on the number of products, product length, and pipe characteristic, or on one or both of the main reels.

Such products can be laid on the sea bottom independently or simultaneously with the pipeline and attached as a "piggyback" to the pipeline in the work station located in the tower. The product can be conveyed out of the storage areas to a position next and parallel to the pipeline in the tower by a second bend controller.

When a smaller diameter pipeline is to be laid (for example 2 inch–6 inch or 5.08 cm–15.24 cm) with the main pipeline and as a piggyback to the main pipeline, this smaller pipeline is preferably fabricated on shore and stored on reels located on the ship's deck. This smaller pipeline is conducted to the same position described above for umbilicals and flexible lines in the tower or work station. In this case, the small diameter pipeline is plastically bent and is straightened by another straightening device installed next to the one used for the main pipeline.

The present invention thus provides a method and apparatus for laying rigid pipelines, such as for example between 3 and 12 inches (7.62 and 30.48 cm) in diameter, on a sea bed and to lay, simultaneously or in sequence, long lengths of flexible products (umbilicals) and simultaneously limited lengths of small diameter (between about 2 inches and 6 inches or 5.08 to 15.24 cm) rigid pipelines. The system of the present invention thus provides a dynamically positioned ship of adequate length, width and depth.

The ship provides a deck that has multiple areas for storing pipeline lengths (pipeline or pipe joints). The deck provides an area for fabricating the pipeline from line pipe (firing line). A pair of storage reels are provided, preferably port and starboard reels. These reels or drums are powered separately from each other. Each drum or reel provides a back tension of, for example about 50 Te on the pipeline when it is used for pipe laying.

An area below deck can be provided to locate flexible products storage including for example a rotating basket.

An area on the deck is provided to locate multiple storage reels and their drives.

An opening on the deck is provided to load and unload flexible products into the below deck rotating basket.

An opening can be provided in the ship's hull (moon pool) located, for example, approximately amidship.

A tilting tower is provided that preferably tilts between about 65 and 90 degrees from the deck plane.

A pipeline hold off clamp is located at the bottom end of the tilting tower. A retractable enclosure can be located at the middle part of the tilting tower to protect a provided work area.

Multiple pipeline tensioning devices can be provided, one located on the ship deck and one or two located vertically on the upper part of the tilting tower.

A device can be provided for straightening the pipeline during laying. A pipeline guiding device can be provided to conduct the pipeline from the reel that is used for pipe laying to the bend controller and straightener located on the tower.

A flexible product and small diameter rigid pipeline guiding device can be provided for conducting such products from their storage area on or below deck to the entry of the straightener.

Multiple work stations, such as welding stations can be provided on the tower.

A winch can be located below deck for lowering the pipeline to the sea floor when pipe laying is completed.

Multiple retractable sheaves can be used in conjunction with the winch.

The present invention thus provides an improved pipeline laying ship and its method of operation. The improved reel ship apparatus of the present invention includes a dynamically positioned barge or self-propelled dynamically positioned ship having a deck. A pair of reels or drums are supported upon the deck, each reel or drum being powered and independently rotatable. The reels are preferably positioned port and starboard relative to one another.

A pipe joint storage area is provided on the deck that contains multiple joints of pipe.

One or more pipeline welding stations on the deck define a "firing line" that is positioned next to the reels. The pipeline welding stations are also positioned to join the joints of pipe together to form an elongated pipeline that can be wound upon a selected reel of said pair of reels.

After a selected reel has been filled with a pipeline, a tower is provided for guiding the elongated pipeline as it is unwound from the selected reel during the pipeline laying operation. The tower can include a bend controller, a straightener, a tensioner and a clamp mechanism.

The welding stations and tower are movably mounted upon the hull along a transverse path between port and starboard positions. This enables a pipeline to be welded and then wound upon either of the reels. Later, the pipeline can be unwound from either of the reels for launching to the sea bed via the tower.

The reels are preferably each supported to rotate about a generally horizontal axis.

The reels are preferably positioned generally parallel to one another and generally in between the pipeline welding stations on deck and the tower.

The present invention provides an improved method of laying a pipeline on a sea bed. The method first progressively joins joints of pipe (eg. 40 foot joints) together upon the deck of a vessel at a firing line to form a long pipeline. The vessel includes a pair of reels and a tower for launching the pipeline. The method includes winding the pipeline upon a selected reel of the pair of reels as the lengths pipe are joined (eg. welded) together at the firing line.

The method further includes the step of bending the pipeline to approximate the curvature of a reel before winding the pipeline upon the selected reel. With the present invention, one reel can be paying out a completed pipeline for placement on the seabed while the other reel is simultaneously being wound with a pipeline as it is being fabricated at the firing line. Two or more pipelines can be fabricated, reeled and then unwound for placement, and, if desired, joined together to make one very long pipeline.

After a selected reel is fully wound with a pipeline of selected length, the selected reel is moved along a path in which the pipeline is to be laid while unwinding the pipeline from the reel and simultaneously straightening the pipeline.

The method of the present invention provides that the reels are independently rotatable so that either reel can be wound with a pipeline independently of the other.

The method further includes the step of moving the firing line in a port to starboard direction that aligns the pipeline as it is being formed with a selected reel.

The method of the present invention also includes moving the tower in a port to starboard direction that aligns the tower with a selected reel during unwinding.

The reels preferably rotate about a generally horizontal axis and the method can further include the step of passing the straightened pipeline through a tensioner.

In the method of the present invention, the combined tension imposed on the pipeline by the tensioners and a drum back tension compensate for the suspended weight of the pipeline during its travel from the hull to the sea bed.

The method of the present invention further comprises the step of adjusting the tension on the pipeline depending upon pipeline laying parameters that include pipeline characteristics and water depth during pipe laying operation.

The method further includes providing a tower to guide the pipeline from a selected reel to the sea bed. The tower can be provided amidships for launching the pipeline through a vertical hull opening or "moon pool". The tower can be placed at the hull stern, behind the reels for launching the pipeline off the vessel stern. The method further comprises the step of coordinating the tension applied by the tensioner as the ship moves along the pipeline route to insure that the stresses in the pipeline are maintained with an acceptable limit.

The method of the present invention further includes the step of using a specially configured hold off clamp to support the pipeline so that a manifold or manifolds, corrosion anodes, and insulation coating can be applied thereto. A moon pool can be provided for receiving the pipeline from the tower for launching to the seabed. Alternatively the tower can be positioned at the vessel stern for launching the pipeline off the stern.

DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a fragmentary view of the preferred embodiment of the apparatus of the present invention and illustrating the method of the present invention;

FIG. 6 is an enlarged fragmentary, plan view of the preferred embodiment of the apparatus of the present invention and illustrating the method of the present invention and illustrating the method of the present invention;

FIG. 7 is an elevation view showing an alternate embodiment of the apparatus of the present invention and illustrating an alternate method of the present invention;

FIG. 8 is a plan view of the alternate embodiment of the apparatus of the present invention and illustrating the alternate method of the present invention;

FIGS. 10A–10B are elevation views of an alternate embodiment of the apparatus of the present invention;

FIG. 12 is a partial side, elevation view of a third embodiment of the apparatus of the present invention;

FIGS. 14A–14H are schematic views illustrating operation of the clamp portion of the apparatus of the present invention;

FIG. 17 is a fragmentary view of the third embodiment of the apparatus of the present invention;

FIG. 18 is a top sectional view of the third embodiment of the apparatus of the present invention illustrating the rollers in an open position; and FIG. 19 is a plan fragmentary view of the third embodiment of the apparatus of the present invention showing the rollers in a closed position.

DETAILED DESCRIPTION OF THE INVENTION

Figure 1:
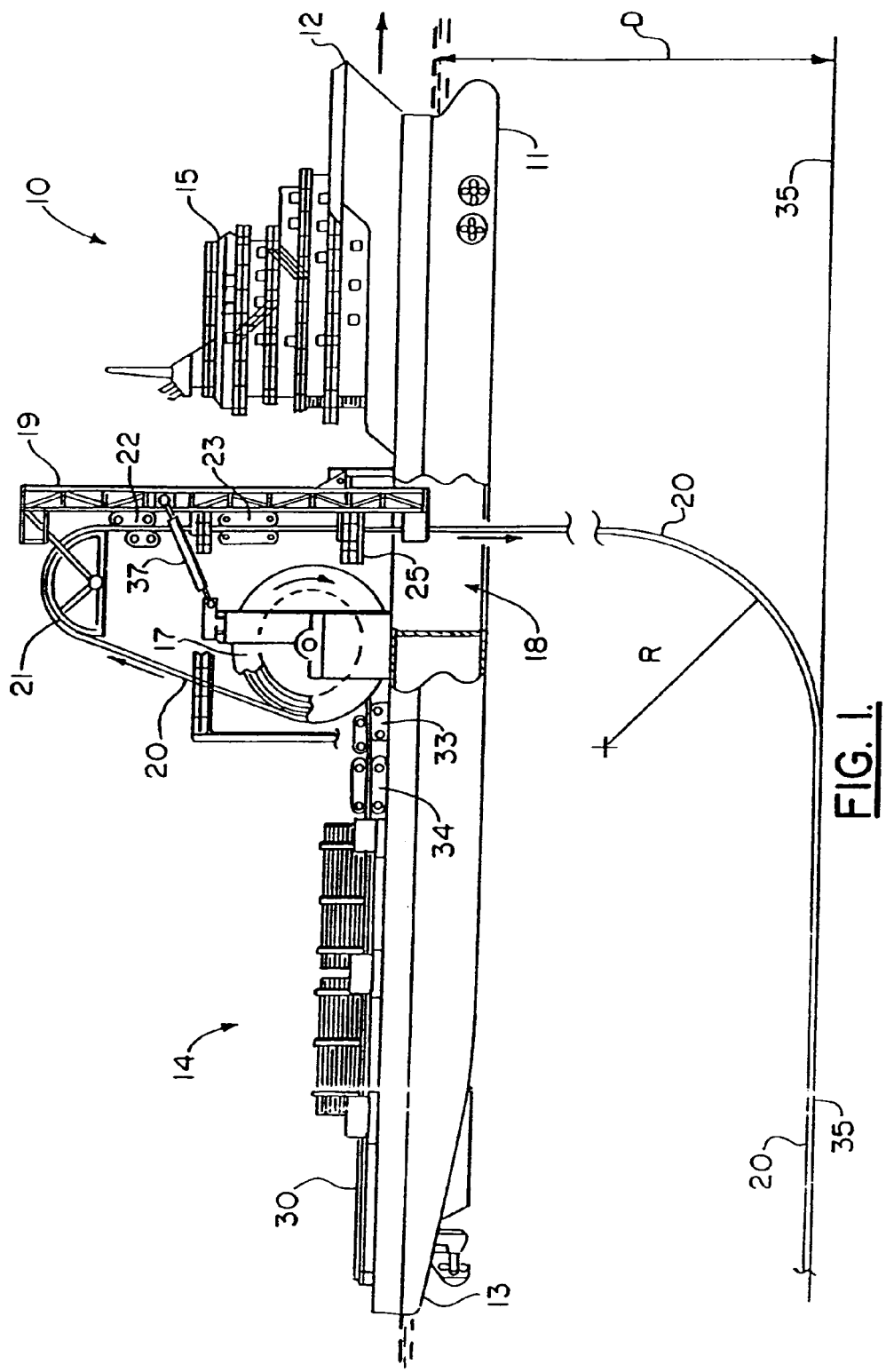
FIG. 1 is an elevation view showing the preferred embodiment of the apparatus of the present invention and illustrating the method of the present invention.
Figure 2:
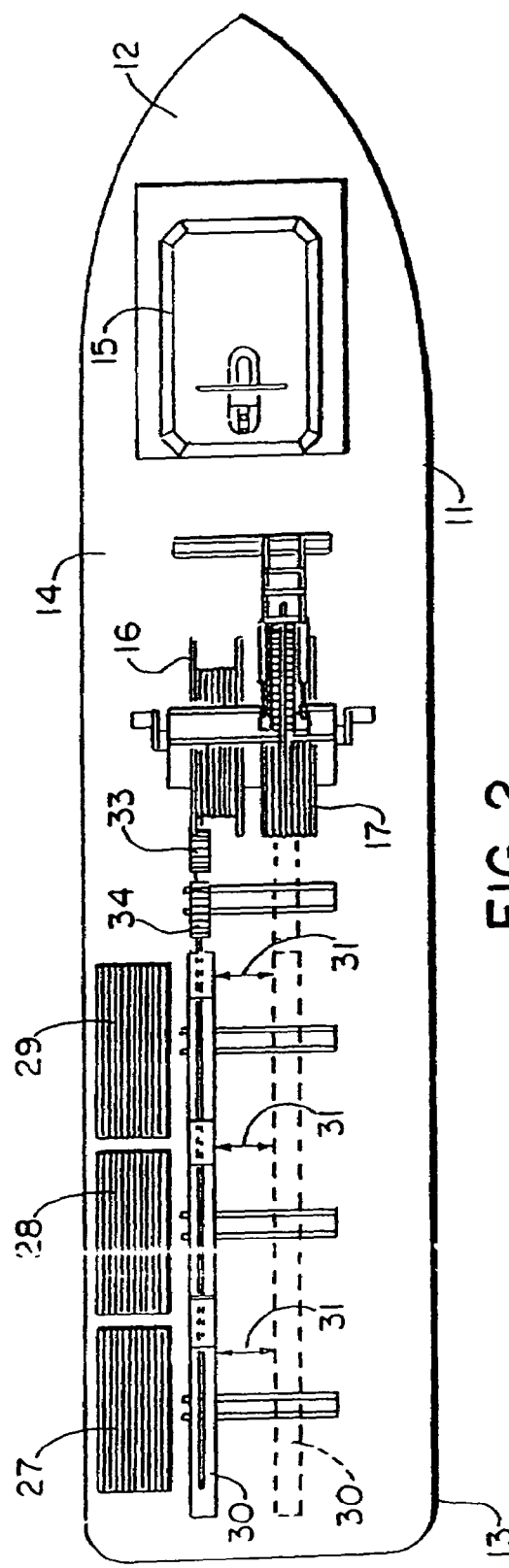
FIG. 2 is a plan view of the preferred embodiment of the apparatus of the present invention and showing the method of the present invention.
Figure 3:
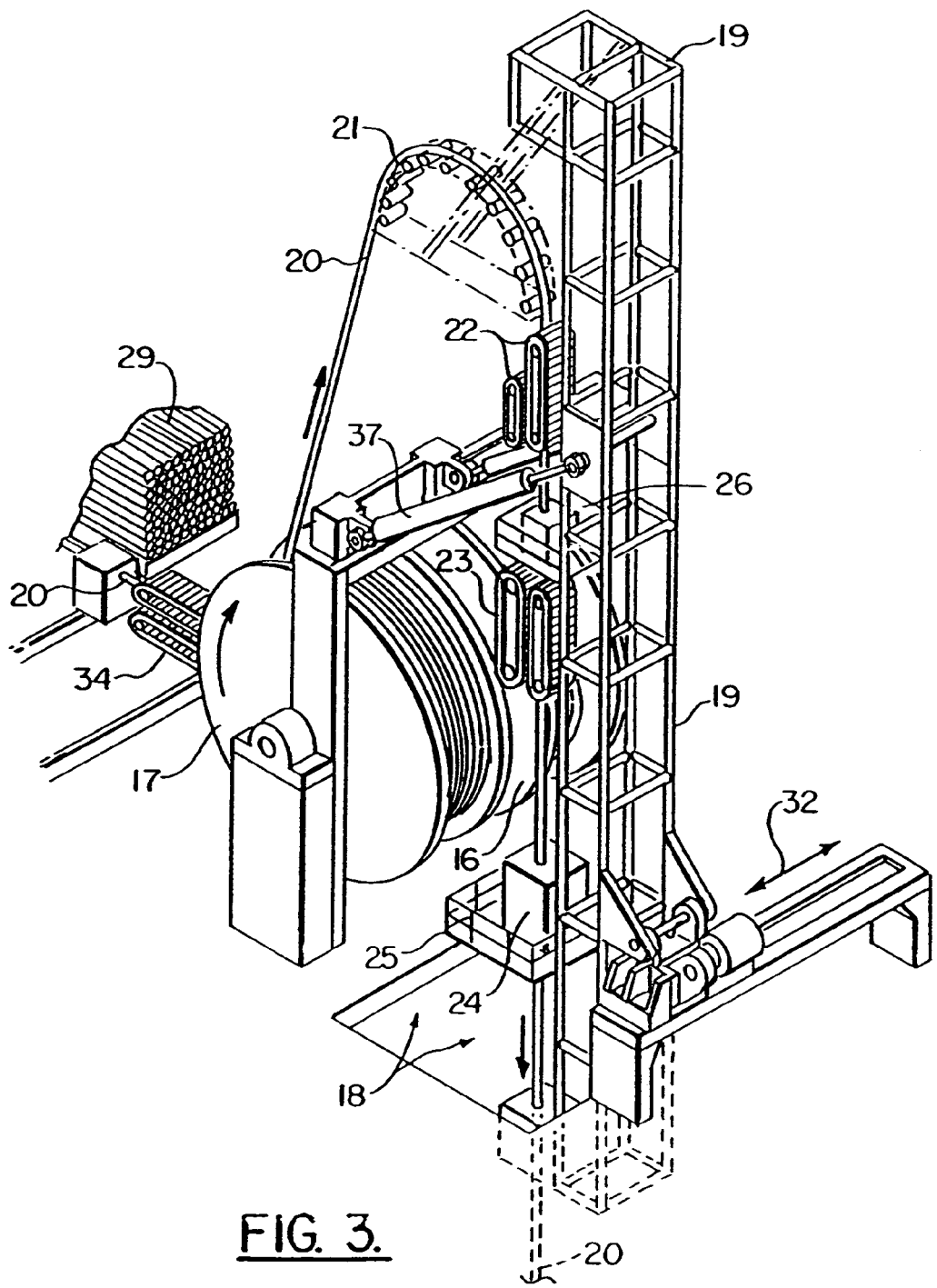
FIG. 3 is a fragmentary perspective view of the preferred embodiment of the apparatus of the present invention and illustrating the method of the present invention.
Figure 4:
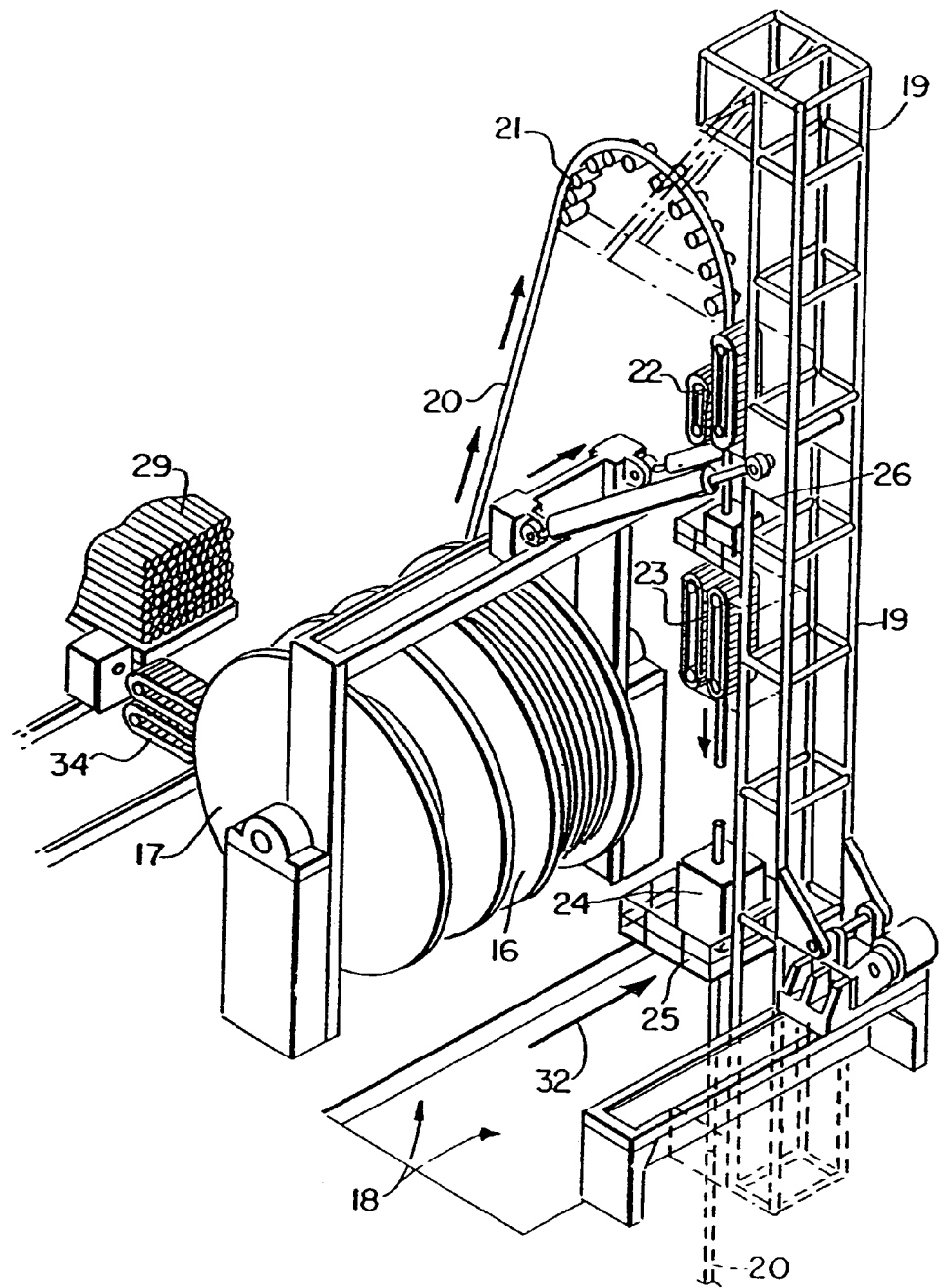
FIG. 4 is a fragmentary perspective view of the preferred embodiment of the apparatus of the present invention illustrating the method of the present invention.

The attached drawing FIGS. 1 and 2 show a reel-type dynamically positioned barge or self-propelled dynamically positioned pipeline laying ship 10 that includes a hull 11 having bow 12 and stern 13 portions. A deck 14 supports a superstructure 15 that can include for example, accommodations for the crew, sleeping quarters, a galley, hospital, heliport, and the like. As pipeline fabrication proceeds, pipe joints are moved one by one from pipe rack storage areas 27, 28, 29 to the pipeline fabrication area, also referred to as the firing line 30.

This fabrication area or "firing line" 30 can comprise essentially a set of rollers supporting the pipeline 20 along the center line of the fabrication area 30. Welding equipment (manual or automatic) can be provided together with known weld preparation tools. The firing line 30 can be comprised of one or more welding stations.

Firing line 30 is an area of the deck that is a designated area for welding sections of pipe together to form a pipeline 20 that will be reeled upon a selected one of the drums or reels 16 or 17. These drums or reels 16 and 17 are preferably independently driven and independently rotatable.

Incoming pipe joints are aligned with the pipeline being fabricated. The welded area between the pipe joints and the joints previously welded together can be adjusted as required. The pipe joints are progressively welded together at multiple welding stations to form a pipeline 20.

In the stern area of the deck 14, a plurality of pipe storage racks 27, 28, 29 can be provided such as those shown in FIG. 2. Welding stations are positioned near these storage areas 27, 28, 29 and arranged to receive multiple joints of pipe that have been internally cleaned and prepared for welding. Part of this preparation can include, for example, end bevels that are applied to the pipeline. The welds are tested and field joints are then coated at another work station located in the pipeline fabrication area or firing line 30.

A trapezoidal through hull opening or moon pool 18 is provided amidships through which the pipeline 20 can be launched for placement on the seabed. A tilting tower 19 is supported by the hull 11 next to the moon pool 18, as shown in FIGS. 1 and 2. The moon pool 18 is preferably positioned in front of reels 16, 17 and behind the tilting tower 19. However, an alternative deck plan could position the tower 19 at stern 13. The reels 16, 17 could then be positioned near the stern 13 and in front of the tilting tower 19.

The tilting tower 19 includes a number of components including a bend controller 21, pipe straightener 22, tensioner 23, hold-off clamp 24, and a pair of welding stations at 25, 26.

The double arrows 31 in FIG. 2 indicate schematically that the firing line 30 can be selectively shifted between port and starboard positions along a transverse path. In this fashion, the pipeline 20 that is being welded upon the firing line 30 can be spooled upon either of the reels 16 or 17. The firing line 30 moves to port or to starboard in order to align with the selected reel 16 or 17.

A bending shoe 33 and tensioner 34 can be used to bend and tension the pipeline after it is welded and as it is being spooled upon a selected one of the drums 16 or 17. Each of these components (shoe 33 and tensioner 34) preferably move between port and starboard positions as indicated by arrows 31. As welding is completed, a selected reel 16 or 17 is readied for storage. In keeping with the present invention, two (2) reels or drums 16, 17 are provided. About 40 feet (12 m) of pipeline is advanced and wound upon the selected reel by plastic bending. The pipeline 20 moves ahead in the pipeline fabrication area by the same distance (eg. forty feet increments or 12 m) through a back tensioning device.

When the ship 10 undertakes pipe laying on the sea bottom 35, the pipeline 20 that is stored on a selected drum 16 or 17 leaves the drum 16 or 17 in a direction tracking toward the top of tilting tower 19. At the top of the tower 19, the pipeline 20 bends through a bend controller 21 downwardly toward the seabed 35. The tilting tower 19 can be provided with bend controller device 21 for bending the pipeline, a straightener 22 for straightening the pipeline, a tensioner 23 and a clamping device 24 that can hold the pipeline 20 and support the weight of the pipeline 20 that extends downwardly toward the seabed 35. When it is time to lay the pipeline 20, the tilting tower 19 can move between port and starboard positions as indicated schematically by the double arrow 32 in FIG. 2. The tilting tower 19 can align with a selected drum such as with the drum 17 in FIG. 2 as shown. The tilting tower 19 can tilt in a position that varies such as, for example, between about 65 and 90 degrees from deck plane 36.

With the improved arrangement of the present invention, the firing line 30 and tower 19 both move transversely back and forth for two reasons. The firing line 30 and tower 19 move transversely in order to coordinate with the reel rotation, thus spooling the welded pipeline 20 upon the selected reel in an orderly fashion. Secondly, the firing line 30 and tilting tower 19 move transversely in order to align with either the first 16 or the second 17 reel as selected by the vessel operators. This larger transverse movement occurs when winding of the pipeline 29 one the first reel 16 is complete, and the winding of the pipeline on the second reel 17 begins.

Figure 1A:
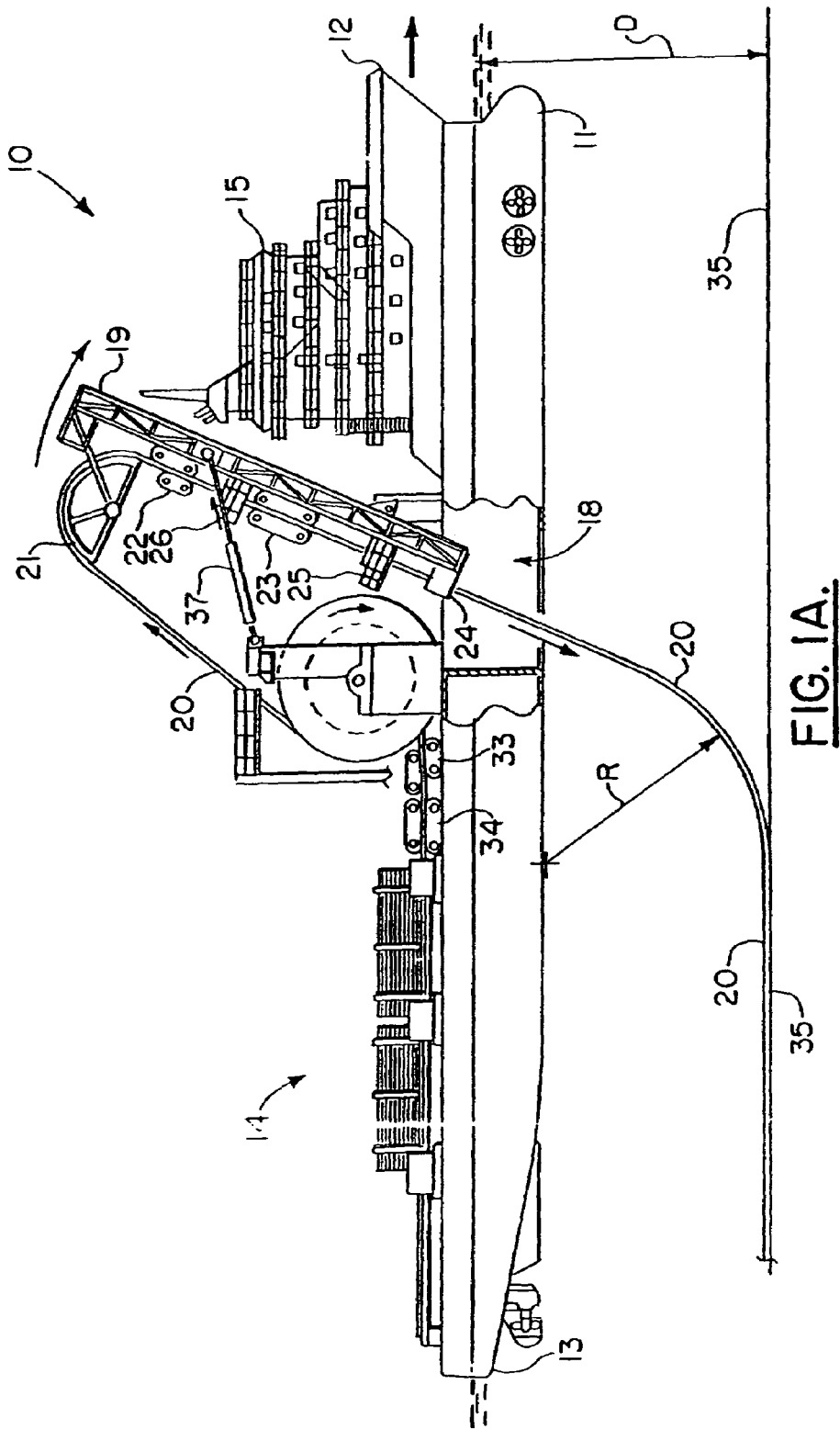
FIG. 1A is another elevation of the preferred embodiment of the apparatus of the present invention showing the tower in a tilted orientation.

When leaving the bend controller 21, the pipeline 20 passes through straightening device 22 that imposes a reversed plastic bending on the pipeline 20 in order to straighten it. The straightened pipeline 20 then passes through vertical tensioner 23. The reel back tension compensates for the suspended weight of the pipeline 20 during its travel from the ship hull 11 to the sea bottom 35. This tension is adjusted depending on the various pipe laying parameters such as pipeline characteristics and water depth during lay operations. The proper tilting of the tower 19 and the coordination of the tension as the hull 11 moves along the pipeline route ensure that the stresses in the pipeline 20 are maintained within a predetermined, predefined acceptable limits. Hydraulic cylinder 37 can be used to tilt tower 19 (see FIGS. 1 and 1A).

The welding station 25 in between the last tensioner 23 and the clamping mechanism or "hold off" clamp 24 can be used to support the pipeline 20 and install corrosion and insulation coating when required on the pipeline joints that are welded in the pipeline fabrication area 30 or "firing line," or in the tower 19 itself. A welding station 25 or 26 can be used to install pipeline initiation, lay down, and testing devices at the beginning and the end of the pipeline lay operations from either of the two reels 16, 17.

The pipeline 20 eventually leaves the ship hull 11 after passing through the hold off clamp 24 that has the ability to hold the pipeline suspended weight during lay down operations. For pipelines 20 that cannot be coiled on the reel drums, 16, 17 the titling tower 19 can be arranged to weld pipeline joints at one welding station 25 and to perform nondestructive testing and field joint coating at another welding station 26.

The tension required to hold the weight of the suspended part of the pipeline 20 being placed is being provided by the tensioner 23 located on the tilting tower. Assistance can be provided by the tension from an A & R winch wire to support the suspended weight of the pipeline 20. A winch wire can be routed to the top end of the pipeline 20 through a sheave located on top of the tower 19. In this case, collars are welded to the pipeline 20 and are used to transfer the A & R winch rope tension to the pipeline 20.

When an umbilical or flexible line installation is required, the ship 10 can load this product in either a large capacity rotating basket located for example below deck, or on one or both of the main reels 16, 17, or on several smaller reels located on the ship deck 14, depending on the number of products, product length and characteristics.

Such products can be placed to the sea bottom independently or simultaneously with the pipeline and attached as a "piggyback" to the pipeline in the work station located in the tower and the work station. The product is conducted out of the storage areas to a position next and parallel to the pipeline in the tower by a second bend controller.

When smaller diameter pipeline is to be placed (for example, 2 inch–6 inch or 5.08–15.24 cm) with the pipeline as a piggyback to the pipeline, this smaller pipeline is preferably fabricated on shore and stored on reels located on the ship's deck 14. This pipeline is conducted to the same position described above for umbilicals and flexible lines in the tower or work station. In this case, the small diameter pipeline is plastically bent around the system and second conduit and is straightened by another straightening 30 device installed next to the one used for the main pipeline.

The present invention thus provides a method and apparatus for laying rigid pipelines, such as for example between 3 and 12 inches (7.62 and 30.48 cm) cm in diameter, on a sea bed and to lay, simultaneously or in sequence, long lengths of flexible products (umbilicals) and simultaneously limited lengths of small diameter (between about 2 inches and 6 inches or 5.08 and 15.24 cm) rigid pipelines. When a smaller diameter pipeline is to be laid (for example 2 inch–6 inch or 5.08–15.24 cm) with the pipeline as a piggyback to the pipeline this smaller pipeline is preferably fabricated on shore and stored on reels located on the ship's deck. This pipeline is conducted to the same position described above for umbilicals and flexible lines in the tower or work station. In this case, the small diameter pipeline is plastically bent around the system and second conduit and is straightened by another straightening device installed next to the one used for the main pipeline.

One feature of the present invention is that one drum 16 can be loaded with a pipeline 20 as it is being welded together as a first operation independent of pipe laying. The other drum (previously loaded with a pipeline) can be rotated to pay out the pipeline 20 independently of the other drum, and route it through the tilting tower 19 and its components 22, 23, 24, 25, 26 to the moon pool 18 and then downwardly to lay upon the seabed. The invention has unique features that include the laterally traversing firing line and the two independently driven drums, either of which can, independently of and/or simultaneously with the other, receive a welded pipeline to be spooled, or pay out a spooled pipeline to be placed on the seabed 35.

FIGS. 7 and 8 show an alternate embodiment of the apparatus of the present invention designated generally by the numeral 10A. In FIGS. 7 and 8, reel pipeline lay barge 10A has a hull 11 that is similarly configured to the embodiment of FIGS. 1–6. However, the lay barge 10A of FIGS. 7 and 8 provides a different positioning for the port and starboard drums 16,17, the moon pool 18, and the tilting tower 19. In FIGS. 7 and 8, the reels or drums 16,17 are closer to the bow 12 of the hull 11. The tilting tower 19 is positioned immediately aft drums 16,17. Moon pool 18 is positioned aft tilting tower 19. The tilting tower 19 is thus positioned in between the moon pool 18 and the pair of drums or reels 16,17.

The tower 19 can be tilted using boom 38. Boom 38 can be connected to any suitable support 40 on hull 11 using, for example, a pinned connection 39.

A traveling member 42 can be slidably affixed to boom 38. The traveling member 42 can, for example, be one or more hydraulic cylinders that can be expanded or retracted during use. The boom 38 provides openings for 43 that are preferably regularly spaced along the length of the boom 38. Pins can be provided at end portions of the hydraulic cylinders for engaging the openings 43. The pins are preferably remotely operable using pneumatic or electrical controllers. In this fashion, the pins 44 can be inserted into selected of the openings 43 as the hydraulic cylinders are expanded and then contracted. The traveling member 42 can be moved in a ratchet fashion along the length of the boom 38 to change the angular position of the titling tower 19 relative to deck 14. The traveling member 42 can thus be pinned at pinned connection 41 to tilting tower 19. Alternatively, a rack and pinion gear arrangement can interface between boom 38 and traveling member 42.

FIGS. 9, 10A–10B and 11A–11B show an alternate embodiment of the apparatus of the present invention designated generally by the numeral 10B. Reel pipe line lay barge 10B includes a hull 45 having a bow 46 and stern 47. The hull 45 has a deck 48 that supports a super-structure 49.

A pair of drums are mounted on the deck 48 of hull 45. These drums include a port drum 50 and a starboard drum 51.

Figure 9:
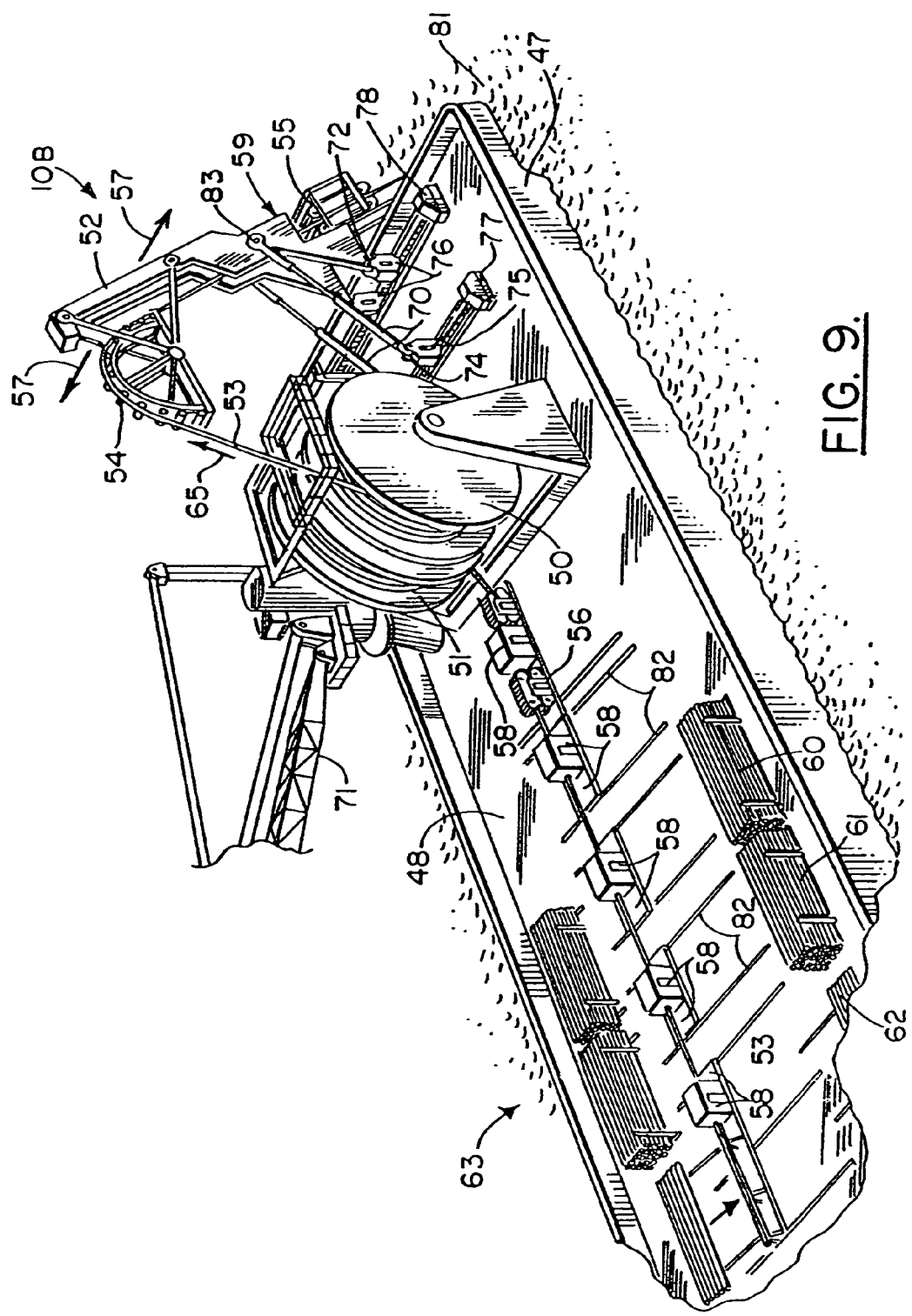
FIG. 9 is a perspective view of an alternate embodiment of the apparatus of the present invention.
Figure 10A:
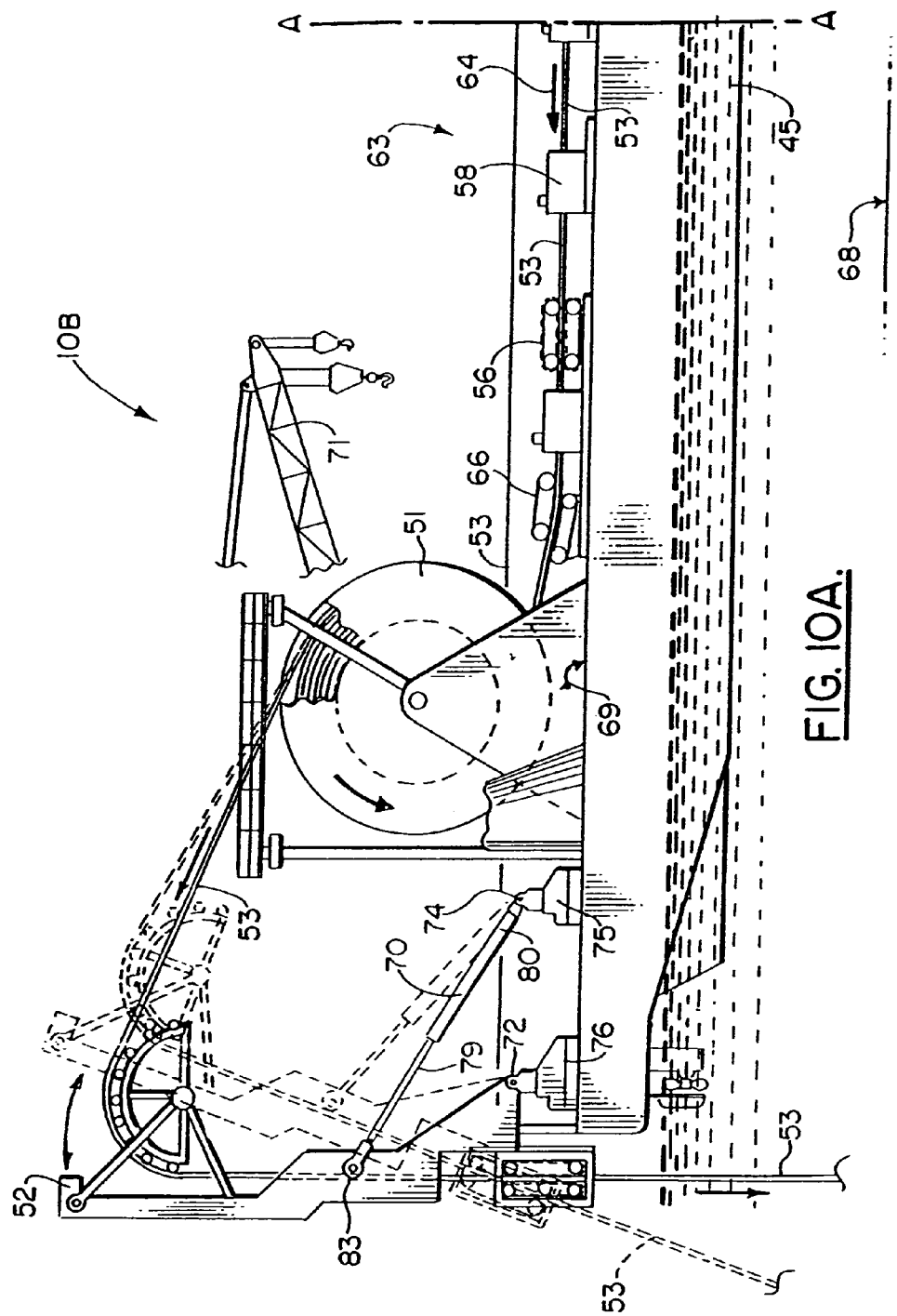
Figure 11A:
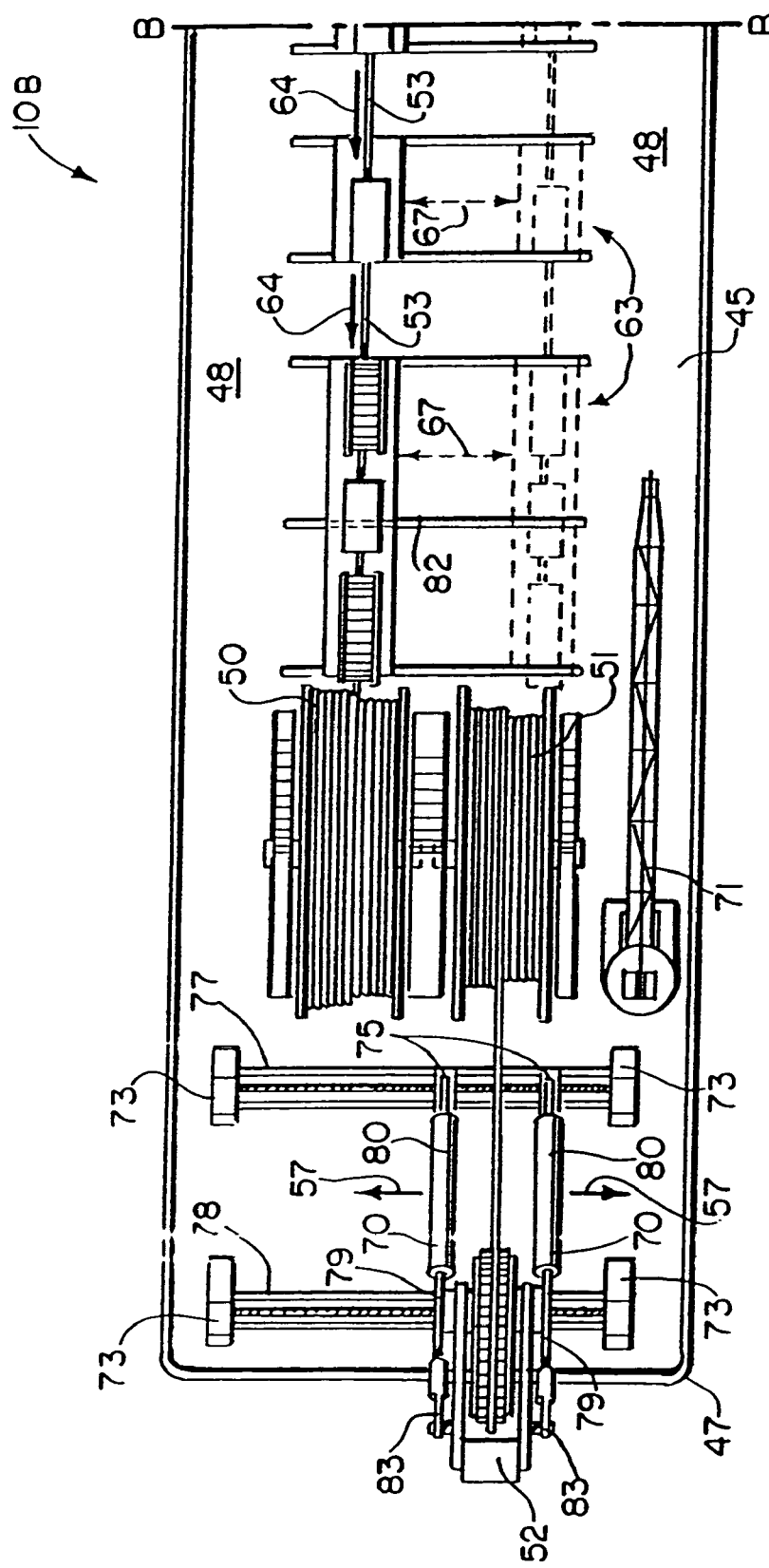
FIGS. 11A–11B are plan views of the alternate embodiment of the apparatus of the present invention.
Figure 11B:
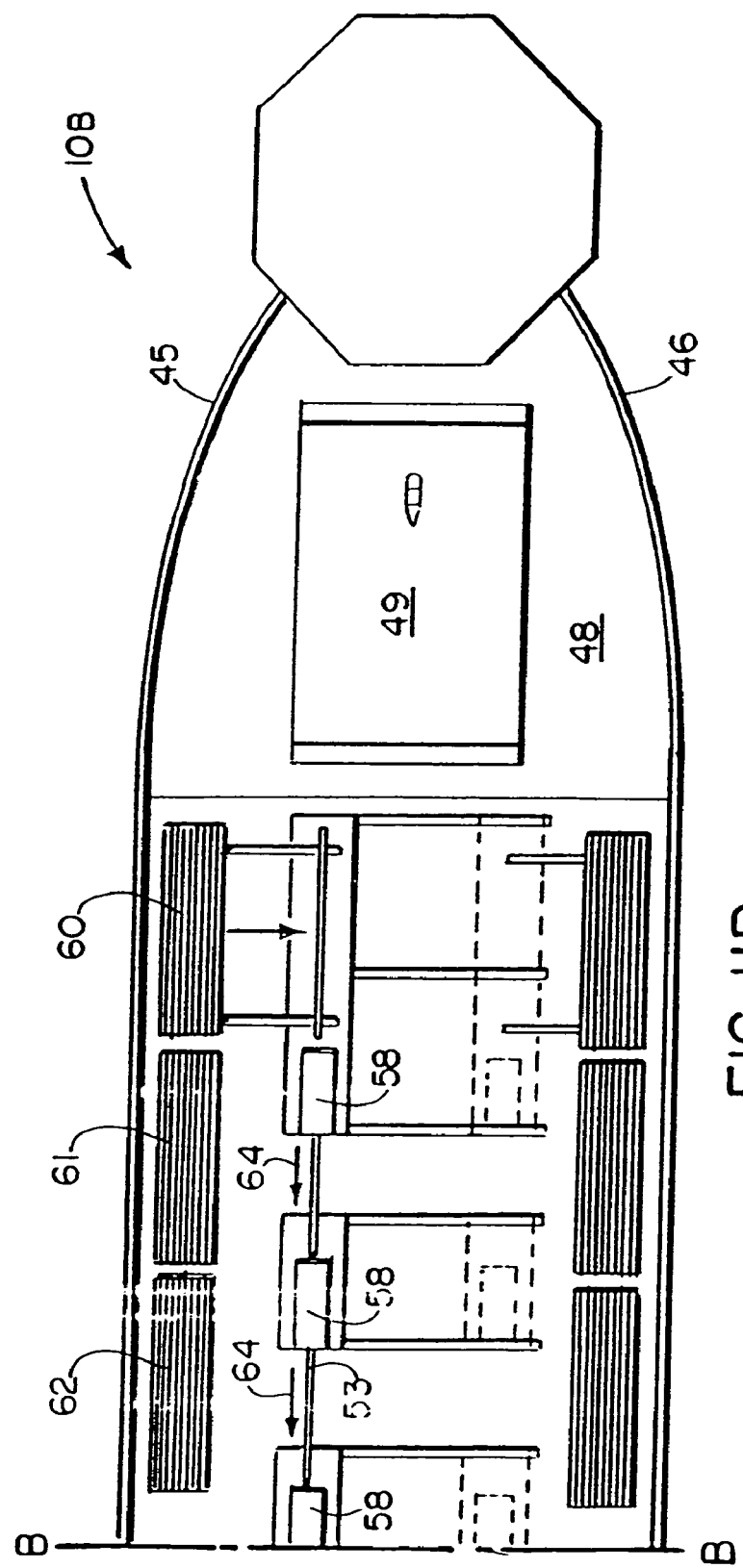

At the stern 47 of hull 45, tilting tower 52 is attached to the deck 48 at a pair of provided tracks 77, 78. The tracks 77, 78 are generally parallel to one another and are perpendicular to the vessel longitudinal center line, running in a port to starboard direction as shown in FIGS. 9 and 11A.

A pipeline 53 is fabricated at firing line 63 with a plurality of welding stations 58. Arrows 64 indicate generally the direction of travel of the pipeline 53 as it is fabricated at welding stations 58. Pipeline 53 is coiled upon a selected one of the drums 50, 51. In order to align the welding stations 58 of firing line 63 with a particular drum 50 or 51, tracks 82 are provided that run in a port to starboard direction. The tracks 82 are attached firmly to deck 48 and enable each of the welding stations 58 to travel transversely (see arrows 67, FIG. 11A) in a port to starboard direction or in a starboard to port direction, as required in order to align the pipeline 53 being welded with either the port drum 50 or the starboard drum 51.

A bending shoe 66 or like pipe bender bend the pipeline 53 before it is spooled upon a selected reel 50 or 51. A pipe bending station 54 or tower 52 provides a bend control for the pipeline 53 that is to be spooled upon a selected drum 50 or 51. A pipe straightener 55 is provided for straightening the pipeline before it is to be launched to the sea bottom 68. The pipe straightener 55 is preferably mounted upon tilting tower 52.

Tensioners 56 can also be provided at selected locations. A tensioner 56 can be placed next to the welding stations 58 on deck 48. A tensioner (not shown) can also be placed on the tiling tower 52. The tilting tower 52 can also provide a hold off clamp such as clamp 24 in the preferred embodiment and a welding station 59 at a location generally in between bending station 54 and hold off clamp 57.

One or more pipe storage areas or racks 60, 61, 62 are provided next to the welding stations 58, preferably to one side of the tracks 82, such as on the port side thereof as shown in the drawings. Boom 71 mounted upon support 73 can transfer pipe joints from a dock or work boat to deck 48.

A bend controller 54 is provided at the upper end portion of tilting tower 52 as shown for bending the pipeline in a controller manner as it travels from a selected reel 50 or 51 to tilting tower 52. Arrows 65 indicate schematically the travel of pipeline 53 from a selected spool or drum 50, 51 to bend controller 54 of tilting tower 52.

In order to lay the pipeline 53, one of the reels or drums 50, 51 that has been wound with the pipeline 53 is used to unwind the pipeline 53 as shown by arrow 65 so that it can track the bend control 54 and travel through the tilting tower 52 to the water's surface 81 and then to the sea bottom 68.

Tilting tower 52 can be tilted using hydraulic cylinders 70, each hydraulic cylinder providing a cylinder 80 portion and an extensible rod 79. A pair of tracks 77, 78 are provided behind reels 50, 51 and in between reels 50, 51 and the stern 47 of hull 45 as shown.

Tracks 77, 78 have traveling members or carriages 75, 76 that travel upon the tracks 77, 78 respectively. Stops 73 can be provided at ends of tracks 77,78 to limit the travel of carriages 75,76 upon tracks 77,78.

A lower end portion of each of the hydraulic cylinders 70 attaches to a traveling member 75 on forward track 77 at pinned connection 74. Pinned connections 83 are provided for attaching each hydraulic cylinder 70 to tilting tower 52. Tilting tower 52 provides forwardly extending portions 84 that form pivotal connections at 72 with the traveling members 76 that travel upon rear track 78.

The above described connection of tilting tower 52 to hull 45 enables tilting tower 52 to move laterally as indicated by arrows 57 in FIGS. 9 and 11A and to tilt to a desired angle with respect to the vessel deck plane 69. The described connections between tilting tower 52 and hull 45 also enable the tilting tower 52 to move upon its tracks 77, 78 between port and starboard positions that align it with either the port drum 50 or the starboard drum 51. Thus, the tilting tower 52 can receive a pipeline 53 that is to be unwound from either of the drums 50 or 51. Similarly, the laterally movable pipeline firing line 63 enables a pipeline to be welded on the deck 48 and wound more easily upon either of the drums 50 or 51.

One of the features of the present invention is that both of the drums 50 and 51 can be used at the same time, one drum 51 to accept a pipeline being welded at firing line 63 while the other drum 50 can unwind a previously welded pipeline 53 and launch it via tilting tower 53.

In FIGS. 12–19, a third embodiment of the apparatus of the present invention is shown, designated by the numeral 10C. Hull 45 shown in FIG. 12 can be the same hull that was shown and described with respect to the embodiment of FIGS. 7–11B. Hull 45 thus provides bow 46 and stern 47 end portions, a deck 48, and a superstructure 49 (FIG. 10B). A pair of drums 50, 51 (FIG. 9) are rotatably mounted upon deck 48, including a port drum 50 and a starboard drum 51. Tilting tower 52 is pivotally attached to the hull 45 and can move between upright, substantially vertical and inclined positions. The tiling tower supports pipeline 53 as it is unwound from a selected drum 50 or 51 such as the unwinding from drum 51 shown in FIG. 12.

Tilting tower 52 can be provided with bend controller 54, pipe straightener 55, and tensioner 56. The tilting tower 52 can also be provided with a welding station 85 that is next to clamp 86. The welding station 85 as shown in FIG. 13A can provide a slot 97 that enables the pipeline 53 to communicate with an interior 98 of welding station 85.

Figures 13, 13A:
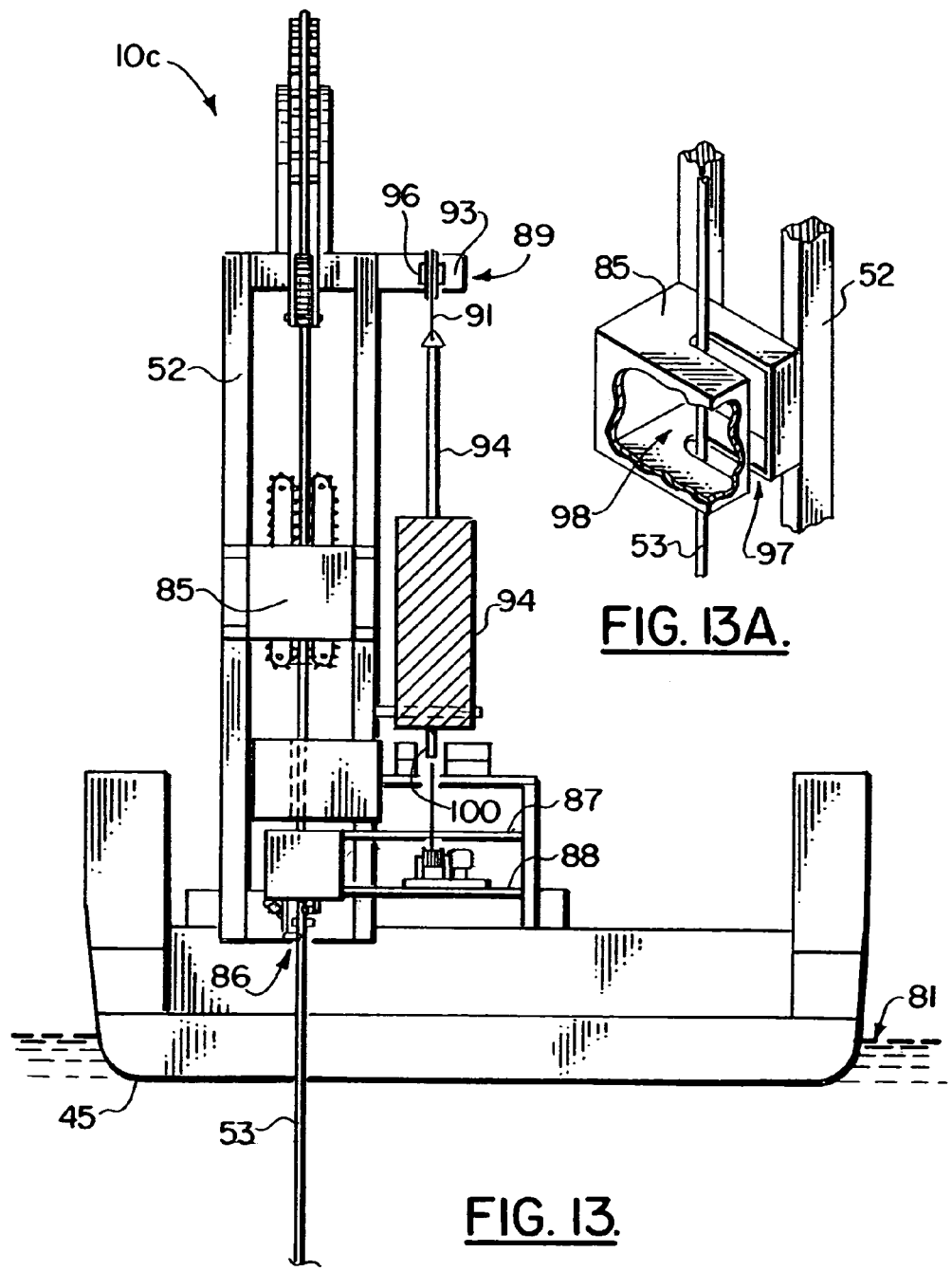
FIG. 13 is a end view of the third embodiment of the apparatus of the present invention.
FIG. 13A is a fragmentary perspective view of the third embodiment of the apparatus of the present invention.

Clamp 86 is preferably mounted upon upper rail 87 and lower rail 88 (FIG. 13). Clamp 86 travels laterally upon rails 87, 88 between a first position that aligns the clamp 86 with pipeline 53 as the pipeline 53 is launched from tower 52 toward the water's surface 81 and the seabed, and a second position that is under and aligned with winch line 91. This aligned position is shown in FIG. 13. The clamp 86 can also move laterally to a position that places clamp 86 under lifting device 89 as shown in FIG. 14B. In this position, clamp 86 can support pipeline 53 after it has been severed, at a position under the lifting device 89, enabling a manifold 94 section of pipe to be added to the pipeline 53. Such manifolds 94 are often required in undersea pipeline installations wherein they are an interface between an underwater pipeline and a wellhead.

As shown in FIG. 12, the lifting device 89 can include a winch 90, winch line 91, and a plurality of sheaves 92, 95, 96. The sheaves 95, 96 are upper sheaves that are mounted upon beam 93 that extends laterally from the upper end portion of tower 52 (FIG. 13).

FIGS. 13 and 14A–14H illustrate a sequence of operation wherein a manifold section 94 is to be added to the pipeline 53. In an initial position shown in FIGS. 13 and 14A, the pipeline 53 is shown as it is being launched from tower 52 toward the water's surface 81 and then the seabed. Clamp 86 is aligned with the pipeline 53 and tower 92. Clamp 86 can be used to clamp the pipeline 53 and hold it, so that the manifold 94 can be installed.

After clamp 86 grips pipeline 53, horizontal line 99 illustrates a transverse cut that is made in the pipeline 53 below tensioner 56 and above clamp 86. In FIG. 14A, the manifold section 94 is being supported by lifting device 89 and its winch line 91. The lower end portion of the manifold section 94 is indicated by the numeral 100 in FIGS. 13 and 14A. In order to add the manifold section 94 to the pipeline 93, a cut section 53A (see FIG. 14B) of pipeline 53 is supported by clamp 86. Clamp 86 can move laterally in the direction of arrows 101 until the severed pipeline section 53A that is supported by clamp 86 is aligned with lower end 100 of manifold section 94, as indicated in FIG. 14B.

Manifold section 94 at its lower end 100 is then welded to the upper end 102 of the pipe section 53A that is supported by clamp 86. Once that weld has been completed, the clamp 86 is moved laterally in the direction of arrow 103 to the position shown in FIG. 14C.

In FIG. 14C, a welding station 104 is provided for workers to make the weld that joins the lower end 100 of manifold section 94 to the upper end 102 of pipeline section 53A that is supported by clamp 86. In FIG. 14C, the weld that joins the manifold section 94 and the pipeline section 53A is designated by the numeral 106. In order to then move the manifold section 94 and pipeline section 53A back into alignment with the remainder of the pipeline 53, the welding station 104 must be retracted as illustrated schematically in FIG. 14D and by arrow 105.

In FIG. 14E, the lifting device 89 lowers the combination of manifold section 94 and pipeline section 53A. In FIGS. 14E and 14F, the manifold section 94 has an upper section 107 of pipe that can be grasped by the clamp 86. Therefore, the winch line 91 of lifting device 89 is lowered in the direction of arrow 108 until the upper section 107 of pipe is at the same elevation as clamp 86 (see FIG. 14F). The clamp 86 is then moved in the direction of arrow 109 until it is positioned next to the upper section 107 of pipe of manifold 94. In this position of FIG. 14F, the clamp 86 can now grip the manifold 94 at the upper section 107. Once the manifold 94 is gripped at upper section 107, the clamp 86 can now travel with pipeline section 53A and the added manifold 94 to the clamp original starting position, as illustrated by arrow 110 in FIG. 14B.

When the clamp 86 returns to its original position, it transports the combination of manifold section 94 and pipeline section 53A back into alignment with the pipeline 53 and tower 52. This combination of manifold section 94 and pipeline section 53A can be welded by joining the upper section 107 of manifold section 94 to the pipeline 53 at cut 111. The weld can be performed at welding station 85.

Figure 14H:
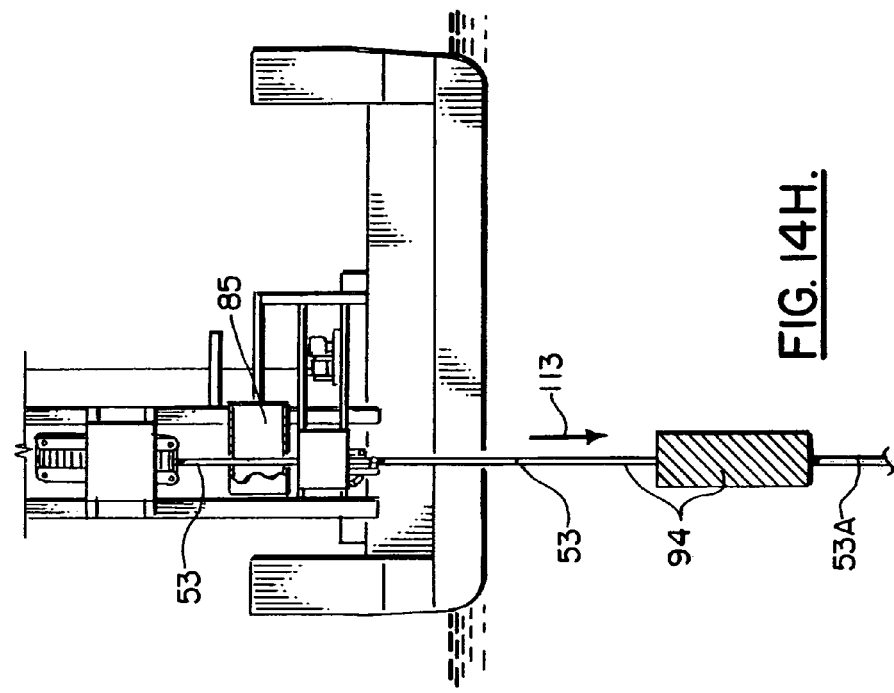
Figure 14G:
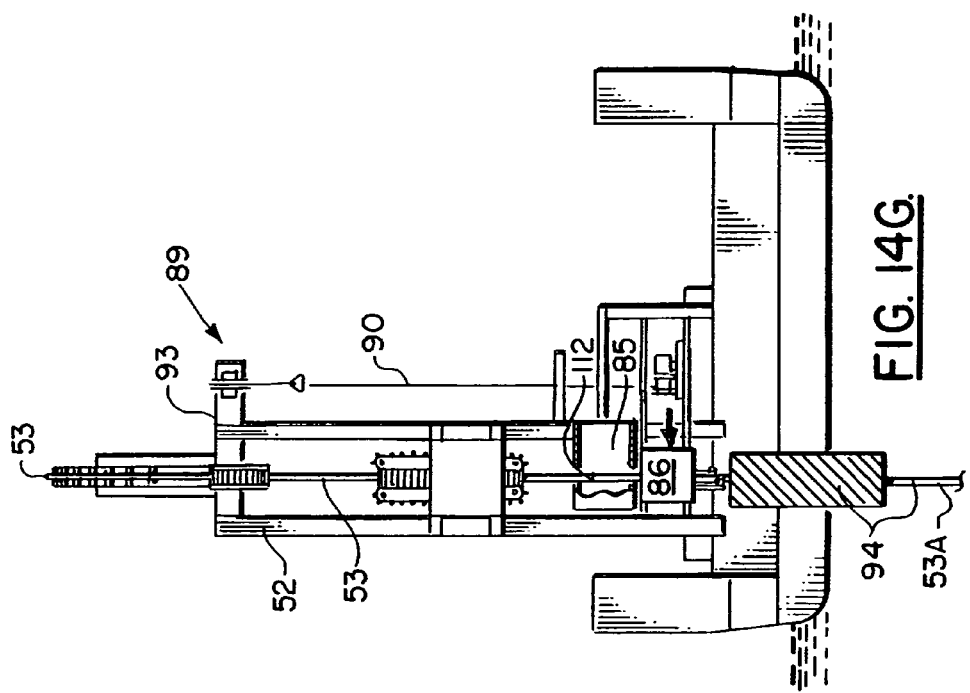

In FIG. 14G, the completed weld is indicated by the numeral 112. The clamp 86 can then be opened so that the combination of pipeline section 53A, manifold section 94, and the remaining portion of pipeline 93 that is wound upon spool 51 can be lowered to the seabed as indicated schematically by the arrow 113 in FIG. 14H.

FIGS. 15–19 show the details of construction of clamp 86. Clamp 86 travels upon the rails 87, 88 between the two positions shown in FIGS. 14A–14H. Rails 87, 88 are shown more particularly in FIG. 16 as being attached to the vessel hull 45 at its stern portion 47. Clamp 86 has a structural frame 120 that supports a plurality of hydraulic cylinders 121–123 supported on frame 120 at a particular elevation.

Figure 15:
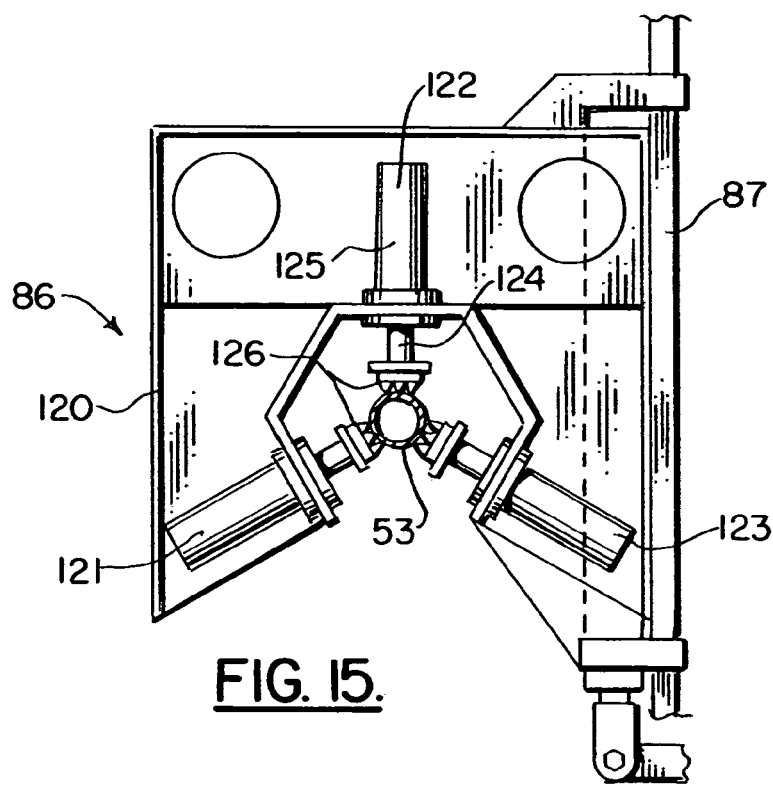
FIG. 15 is a plan, fragmentary view of the third embodiment of the apparatus of the present invention.
Figure 16:
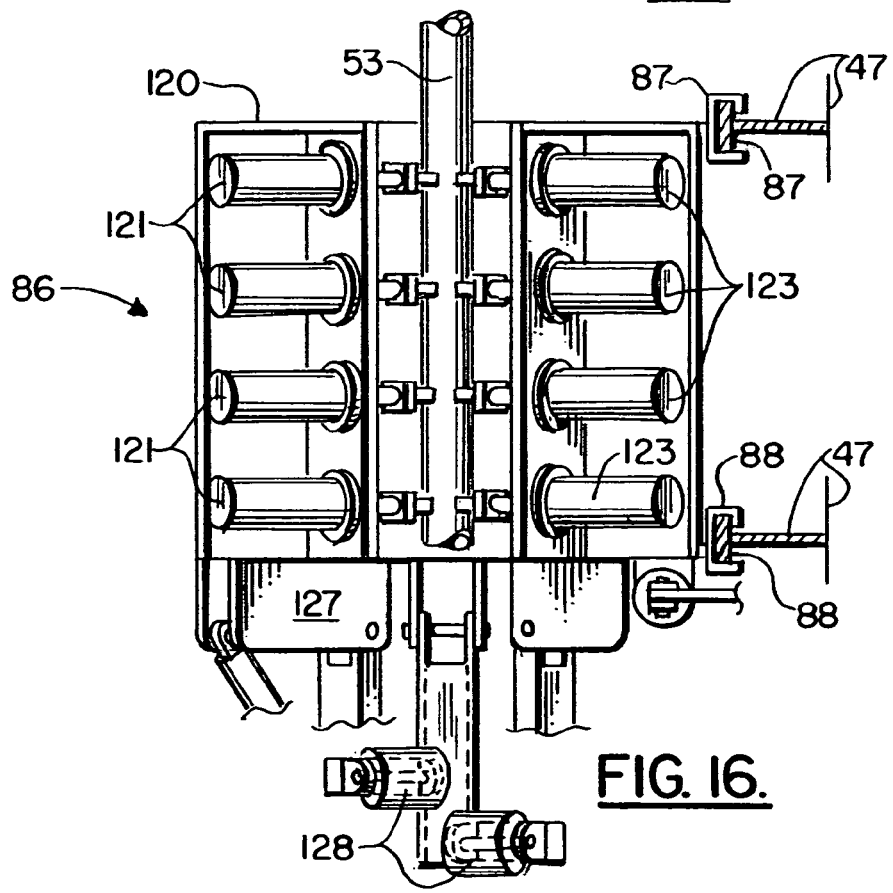
FIG. 16 is a fragmentary side elevation view of the third embodiment of the apparatus of the present invention.

In the embodiment of FIGS. 15–19, a group of three hydraulic cylinders 121, 122, 123 are provided at four different elevations on frame 120. Each hydraulic cylinder 121–123 has a push rod 124 that extends from a cylinder body 125. Each push rod 124 has pipe gripping teeth 126 at an end portion of the push rod 124 opposite the cylinder body 125 as shown in FIG. 15.

It should be understood that more hydraulic cylinders 121–123 can be provided if desired. In a preferred embodiment, the three cylinders 121, 122, 123 are spaced about 120 degrees apart, as shown in the plan view of FIG. 15 and for each level of three cylinders, 121, 122, 123 that are provided on the frame 120.

At the lower end portion 127 of frame 120, a plurality of rollers 128 can be provided that are movable between engaged (FIG. 19) and disengaged (FIG. 18) positions. Each roller 128 can be mounted upon a swing arm 129 that is pivotally attached at pivot 130 to frame 120 as shown in FIG. 17. Each swing arm 129 can be moved by a hydraulic cylinder 131 that is pivotally attached at 132 to the lower end portion 127 of frame 120. Cylinder 131 is pivotally attached at push rod 133 to the lower end portion of swing arm 129. The rollers 128 can be activated to help center the pipeline 53 prior to its being grasped by the plurality of hydraulic cylinders 121–123.

The following is a list of suitable parts and materials for the various elements of the preferred embodiment of the present invention.

PARTS LIST

| Part Number | Description |
|---|---|
| 10 | reel pipeline lay barge |
| 10A | reel pipeline lay barge |
| 10B | reel pipeline lay barge |
| 10C | reel pipeline lay barge |
| 11 | hull |
| 12 | bow |

-continued

PARTS LIST

| Part Number | Description |
|---|---|
| 13 | stern |
| 14 | deck |
| 15 | superstructure |
| 16 | port drum |
| 17 | starboard drum |
| 18 | moon pool |
| 19 | tilting tower |
| 20 | pipeline |
| 21 | bend controller |
| 22 | pipe straightener |
| 23 | tensioner |
| 24 | hold-off clamp |
| 25 | welding station |
| 26 | welding station |
| 27 | pipe storage |
| 28 | pipe storage |
| 29 | pipe storage |
| 30 | firing line |
| 31 | arrow |
| 32 | arrow |
| 33 | bending shoe |
| 34 | tensioner |
| 35 | sea bottom |
| 36 | deck plane |
| 37 | hydraulic cylinder |
| 38 | boom |
| 39 | pinned connection |
| 40 | support |
| 41 | pinned connection |
| 42 | traveling member |
| 43 | opening |
| 44 | pin |
| 45 | hull |
| 46 | bow |
| 47 | stern |
| 48 | deck |
| 49 | superstructure |
| 50 | port drum |
| 51 | starboard drum |
| 52 | tilting tower |
| 53 | pipeline |
| 53A | pipeline section |
| 54 | bend controller |
| 55 | pipe straightener |
| 56 | tensioner |
| 57 | arrow |
| 58 | welding station |
| 59 | welding station |
| 60 | pipe storage |
| 61 | pipe storage |
| 62 | pipe storage |
| 63 | firing line |
| 64 | arrow |
| 65 | arrow |
| 66 | bending shoe |
| 67 | arrow |
| 68 | sea bottom |
| 69 | deck plane |
| 70 | hydraulic cylinder |
| 71 | boom |
| 72 | pinned connection |
| 73 | support |
| 74 | pinned connection |
| 75 | traveling member |
| 76 | traveling member |
| 77 | track |
| 78 | track |
| 79 | extensible rod |
| 80 | cylinder |
| 81 | water's surface |
| 82 | track |
| 83 | pinned connection |
| 85 | welding station |
| 86 | clamp |
| 87 | lower rail |

-continued

PARTS LIST

| Part Number | Description |
|---|---|
| 89 | lifting device |
| 90 | winch |
| 91 | winch line |
| 92 | sheave |
| 93 | beam |
| 94 | manifold section |
| 95 | sheave |
| 96 | sheave |
| 97 | slot |
| 98 | interior |
| 99 | cut line |
| 100 | lower end |
| 101 | arrow |
| 102 | upper end |
| 103 | arrow |
| 104 | welding station |
| 105 | arrow |
| 106 | weld |
| 107 | upper section |
| 108 | arrow |
| 109 | arrow |
| 110 | arrow |
| 111 | cut pipe |
| 112 | weld |
| 113 | arrow |
| 120 | frame |
| 121 | hydraulic |
| 122 | hydraulic |
| 123 | hydraulic |
| 124 | push rod |
| 125 | body |
| 126 | teeth |
| 127 | lower end portion |
| 128 | rollers |
| 129 | swing arm |
| 130 | pivot |
| 131 | hydraulic cylinder |
| 132 | pivot |
| 133 | push rod |

The foregoing embodiments are presented by way of example only; the scope of the present invention is to be limited only by the following claims.

The invention claimed is:

1. A method of laying a pipeline that includes one or more manifold sections on a seabed, comprising the steps of:
   a) providing a floating vessel;
   b) lowering an elongated pipeline from the vessel to the seabed;
   c) clamping an end portion of the pipeline with a clamp;
   d) separating the pipeline above the clamp into two pipeline sections, a first section held by the clamp and a second section above the clamp that is supported on the vessel;
   e) moving the clamp and the clamped first pipeline section so that the first and second pipeline sections are offset;
   f) connecting a manifold to the first pipe section;
   g) moving the clamp so that the first pipe section and connected manifold are in close position to the second pipeline section;
   h) connecting the second pipeline section to the manifold; and
   i) lowering the first and second pipeline sections and manifold to the seabed.

2. The method of claim 1 wherein in step "a" the vessel is a self-propelled vessel.

3. The method of claim 1 wherein in step "a" the vessel is a dynamically positioned vessel.

4. The method of claim 1 wherein in step "b" the pipeline is comprised of joints of pipe that are welded together end to end.

5. The method of claim 1 wherein the method further comprises between steps "a" and "b" welding joints of pipe together to form a pipeline.

6. The method of claim 1 wherein step "c" includes hydraulically operating the clamp.

7. The method of claim 1 wherein in step "c" the clamp has a plurality of hydraulic cylinders and further comprising activating the hydraulic cylinders to clamp the pipeline.

8. The method of claim 1 wherein in steps "a" through "d" at least a part of the pipeline is wound upon a reel on the vessel.

9. The method of claim 8 wherein in step "d" the second pipeline section is wound upon a reel.

10. The method of claim 1 wherein in step "e" the clamp is supported at the stem of the vessel.

11. The method of claim 1 wherein step "f" includes welding the manifold to the first pipeline section.

12. The method of claim 1 wherein step "h" includes welding the manifold to the second pipeline section.

13. The method of claim 7 wherein the clamp is comprised of a frame and a plurality of hydraulic cylinders mounted on the frame, each cylinder having a pipe engaging member and further comprising moving the hydraulic cylinders along radial lines that intersect at the pipeline.

14. The method of claim 1 wherein step "b" comprises lowering an elongated pipeline that is spooled upon a reel from the vessel to the seabed.

15. A method of laying a pipeline that includes one or more manifold sections on a seabed, comprising the steps of:
   a) providing a floating vessel that has a plurality of welding stations thereon for enabling an elongated pipeline to be fabricated by welding joints of pipe together end-to-end;
   b) placing the pipeline on the seabed by preliminarily spooling the elongated pipeline upon a selected reel of a pair of provided reels and then launching the pipeline from a selected reel through a guide tower and then to the seabed;
   c) clamping an end portion of the pipeline with a clamp;
   d) separating the pipeline above the clamp into two pipeline sections, a first section held by the clamp that extends toward the seabed and a second section above the clamp that is supported on the vessel;
   e) moving the clamp and the clamped first pipeline section so that the first and second pipeline sections are offset;
   f) connecting a manifold to the first pipe section;
   g) moving the clamp so that the first pipe section and connected manifold are in close position to the second pipeline section;
   h) connecting the second pipeline section to the manifold; and
   i) lowering the first and second pipeline sections and manifold to the seabed.

16. The method of claim 15 wherein in steps "b" and "c" the guide tower has upper and lower end portions, and the clamp is positioned on the vessel at an elevation near the elevation of the lower end portion of the guide tower.

17. The method of claim 16 wherein the vessel has a clamp support that extends traversely port-to-starboard and step "e" includes moving the clamp upon the clamp support.

18. The method of claim 17 wherein step "e" includes sliding the clamp upon the clamp support.

19. The method of claim 17 further comprising supporting the clamp at spaced apart upper and lower positions with the clamp support.

20. The method of claim 15 wherein in step "a" the vessel is a self-propelled vessel.

\* \* \* \* \*